US006641434B2

(12) United States Patent
Boyle et al.

(10) Patent No.: US 6,641,434 B2
(45) Date of Patent: Nov. 4, 2003

(54) WIRED PIPE JOINT WITH CURRENT-LOOP INDUCTIVE COUPLERS

(75) Inventors: Bruce W. Boyle, Sugar Land, TX (US); Raghu Madhavan, Houston, TX (US); Jacques Jundt, Bethel, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/160,311

(22) Filed: May 31, 2002

(65) Prior Publication Data

US 2002/0193004 A1 Dec. 19, 2002

Related U.S. Application Data

(63) Continuation-in-part of application No. 09/881,333, filed on Jun. 14, 2001, now abandoned.

(51) Int. Cl.$^7$ .............................................. H01R 33/945
(52) U.S. Cl. ........................ 439/577; 439/950; 439/38; 166/242.6
(58) Field of Search ................................ 439/577, 950, 439/38, 191, 194; 166/65.1, 66.5, 242.1, 242.6

(56) References Cited

U.S. PATENT DOCUMENTS

| 3,807,502 A | 4/1974 | Heilhecker et al. ......... 166/315 |
| 3,957,118 A | 5/1976 | Barry et al. ................. 166/315 |

(List continued on next page.)

FOREIGN PATENT DOCUMENTS

| EP | 1 158 138 A2 | 11/2001 | |
| RU | 2040691 C1 | 2/1992 | ........... E21B/47/12 |
| RU | 2140537 | 12/1997 | |
| WO | WO 90/14497 | 11/1990 | |
| WO | WO 02/06716 A1 | 1/2002 | |

OTHER PUBLICATIONS http://www.netl.doe.gov/publications/press/1999/tl%5Fsmartdril1.html U.S. Dept. of Energy Press Release, Oct. 13, 1999, "DOE Selects California Small Business to Help Develop 'Smart Drilling System' for Oil & Natural Gas".

The Oil and Gas Journal, Apr. 1978, pp 115–124, W. J. McDonald, "Four Different Systems Used for MWD".

(List continued on next page.)

Primary Examiner—Tulsidas Patel
(74) Attorney, Agent, or Firm—Jennie (JL) Salazar; Brigitte L. Jeffery; John J. Ryberg

(57) ABSTRACT

A robust, low-loss wired pipe joint is provided for service as a component of a wired pipe string for transmitting measurement data to a surface station from locations in a borehole in oil well drilling and oil well operations. Conductive layers reduce signal energy losses over the length of the drill string by reducing resistive losses and flux losses at each inductive coupler. The wired pipe joint is robust in that it remains operational in the presence of gaps in the conductive layer. A wired pipe joint includes an elongate tubular shank having an axial bore, a threaded box-end, and a threaded pin end. A first annular coil, fixedly mounted to the box-end is partially surrounded by a first high-conductivity, low-permeability layer, and a second annular coil fixedly mounted to the pin-end is partially surrounded by a second high-conductivity, low-permeability layer, such that when the box-end of a first wired pipe joint is coupled for operation with the pin-end of a second wired pipe joint, the first and second high-conductivity, low-permeability layers form at least a portion of a toroidal path enclosing the first annular coil of the first wired pipe joint and the second annular coil of the second wired pipe joint. Coil windings of the first and second coils of the wired pipe joint are electrically coupled.

43 Claims, 17 Drawing Sheets

U.S. PATENT DOCUMENTS

| | | | |
|---|---|---|---|
| 4,126,848 A | 11/1978 | Denison | 340/18 LD |
| 4,605,268 A | 8/1986 | Meador | 339/16 C |
| 4,806,928 A | 2/1989 | Veneruso | 340/856 |
| 4,901,069 A | 2/1990 | Veneruso | 340/853 |
| 5,008,664 A | 4/1991 | More et al. | 340/854 |
| 5,052,941 A | 10/1991 | Hernandez-Marti et al. | 439/194 |
| 5,278,550 A | 1/1994 | Rhein-Knudsen et al. | 340/855.1 |
| 5,521,592 A | 5/1996 | Veneruso | 340/854.8 |
| 5,971,072 A | 10/1999 | Huber et al. | 166/297 |

OTHER PUBLICATIONS

A CPT Presentation, Aug. 2000, Slide 25 of 29, "Cost Effective Composite Drill Pipe".

Hall, David R. "Telemetry Drill Pipe". Novatek, (no date available), pp. 1–2.

McDonald, Wm. J., "Four Basic Systems will be Offered," *Offshore*, pp. 96–99 (Dec. 1977).

WIRED PIPE JOINT WITH CURRENT-LOOP INDUCTIVE COUPLERS

CROSS REFERENCE TO RELATED APPLICATION

This application is a continuation-in-part application, claiming benefit of U.S. application Ser. No. 09/881,333, filed Jun. 14, 2001 now ABN.

TECHNICAL FIELD

The present invention relates to apparatus and methods used in oil well drilling and oil well operations for transmitting measurement data to a surface station from locations in a borehole.

BACKGROUND OF THE INVENTION

Measurement While Drilling (MWD) and Logging While Drilling (LWD) systems derive much of their value from the ability to provide real-time information about conditions near the drill bit. Oil companies use these downhole measurements to make decisions during the drilling process, and sophisticated drilling techniques, such as the GeoSteering system developed by Schlumberger, Ltd. Such techniques rely heavily on instantaneous knowledge of the formation that is being drilled. The industry continues to develop new measurements for MWD/LWD, including imaging type measurements with high data content.

These new measurement and control systems require telemetry systems having higher data rates than those currently available. As a result, a number of telemetry techniques for use with measurement while drilling have been tried or proposed.

The industry standard is mud pulse telemetry that uses the drill pipe to guide acoustic waves in the drilling fluid. Currently, using mud pulse telemetry, data is sent to the surface at bit rates in the range of 1–6 bits/second. Such a slow rate is incapable of transmitting the large amounts of data that are typically gathered with an LWD string. In some cases (e.g., foamed drilling fluid), mud pulse telemetry does not work at all. Normally, some or all of the data is stored in downhole memory and downloaded at the end of the bit run. This delay significantly reduces the value of the data for real-time applications. Also, there is a significant risk of data loss, for example, if the tool is lost in the hole.

Electromagnetic telemetry via earth path has been tried with limited success. Even at very low data rates, it works only to a limited depth, depending on the resistivity of the earth.

Acoustic telemetry through the drill pipe itself has been studied extensively but not used commercially, so far. In theory, data rates in the 10's of bits/second should be possible using acoustic waves in the steel.

The idea of putting a wire in the drill pipe has been proposed numerous times over the past 25 years. Shell and Exxon each reportedly built an experimental wired drill string in the late 1970's. Prior art relating to these efforts is disclosed in U.S. Pat. No. 4,126,848 to Denison, "Drill String Telemeter System"; U.S. Pat. No. 3,957,118 to Barry et al., "Cable System for use in a Pipe String and Method for Installing and Using the same"; and U.S. Pat. No. 3,807,502 to Heilhecker et al., "Method for Installing an Electric Conductor in a Drill String"; and the publication "Four Different Systems Used for MWD", W. J. McDonald, The Oil and Gas Journal, pages 115–124, Apr. 3, 1978. Such systems are believed to have suffered from poor reliability and high cost because of the large number of electrical connectors.

IFP developed a system known as "Simphor" which used wireline cables and large, robust wet connectors. It has never been commercialized for measurement while drilling applications. This system is believed to have suffered from interference with the drilling process.

The use of current-coupled inductive couplers in drill pipe is known. U.S. Pat. No. 4,605,268, to Meador, "Transformer cable connector" describes the use and basic operation of current-coupled inductive couplers mounted at the sealing faces of drill pipes. Russian Federation published patent application 2140527, "A method for drilling oblique and horizontal boreholes", filed Dec. 18, 1997, and an earlier Russian Federation published patent application 2040691, "A system for transmitting electrical energy and data within a column of adjoining tubes", filed Feb. 14, 1992, both describe a drill pipe telemetry system that uses current-coupled inductive couplers mounted proximate to the sealing faces of drill pipes. WO Publication 90/14497A2, by Eastman Christensen GMBH, "Process and device for transmitting data signals and/or control signals in a pipe train" describes an inductive coupler mounted at the ID of the drill pipe joint for data transfer.

Other US patents are as follows: U.S. Pat. No. 5,052,941 to Hernandez-Marti et al., "Inductive coupling connector for a well head equipment"; U.S. Pat. No. 4,806,928 to Veneruso, "Apparatus for electro-magnetically coupling power and data signals between well bore apparatus and the surface"; U.S. Pat. No. 4,901,069 to Veneruso, "Apparatus for electro-magnetically coupling power and data signals between a first unit and a second unit and in particular between well bore apparatus and the surface"; U.S. Pat. No. 5,531,592 to Veneruso; "Method and apparatus for transmitting information relating to the operation of a downhole electrical device"; U.S. Pat. No. 5,278,550 to Rhein-Knudsen, et al., "Apparatus and method for retrieving and/or communicating with downhole equipment"; and U.S. Pat. No. 5,971,072 to Huber et al., "Inductive coupler activated completion system".

None of these references has provided a telemetry system for reliably transmitting measurement data at high data rates from locations near the drill bit to a surface station. Therefore, there exists a need for a telemetry system for reliably transmitting measurement data at high data rates to a surface station from locations in a borehole.

SUMMARY OF THE INVENTION

The present invention provides a robust, low-loss wired pipe joint for service as a component of a wired pipe string for transmitting measurement data to a surface station from locations in a borehole in oil well drilling and oil well operations. Conductive layers reduce signal energy losses over the length of the drill string by reducing resistive losses and flux losses at each inductive coupler. The wired pipe joint is robust in that it remains operational in the presence of gaps in the conductive layer.

A wired pipe joint in accordance with the present invention includes an elongate tubular shank having an axial bore, a threaded box-end, and a threaded pin end. A first annular coil, fixedly mounted to the box-end is partially surrounded by a first high-conductivity, low-permeability layer, and a second annular coil fixedly mounted to the pin-end is partially surrounded by a second high-conductivity, low-permeability layer, such that when the box-end of a first wired pipe joint is coupled for operation with the pin-end of a second wired pipe joint, the first and second high-conductivity, low-permeability layers form at least a portion of a toroidal path enclosing the first annular coil of the first wired pipe joint and the second annular coil of the second wired pipe joint. Coil windings of the first and second coils of the wired pipe joint are electrically coupled.

An inductive coupler in accordance with the present invention includes a threaded box-end with a first annular coil fixedly mounted thereto and a first high-conductivity, low-permeability layer partially surrounding the first annular coil. It further includes a threaded pin-end with a second annular coil fixedly mounted thereto and a second high-conductivity, low-permeability layer partially surrounding the second annular coil. A first electrical terminal is coupled to a first coil winding of the first annular coil, and a second electrical terminal is coupled to a second coil winding of the second annular coil. The threaded box-end, the threaded pin-end, and the two layers are structured such that when the threaded box-end is coupled for operation with the threaded pin-end, the first and second layers form at least a portion of a toroidal path enclosing the first and second annular coils.

A first preferred embodiment is shown in FIG. 1. FIG. 1 shows wired pipe joint including an elongate tubular shank having an axial bore, a first inductive coupler element at a box-end, and a second inductive coupler element at a pin-end. An inductive coupler is shown as constituted by a first inductive coupler element and a second inductive coupler element of the pin-end of an adjacent wired pipe string. The box-end defines an internal thread and an annular inner shoulder with a first slot. The first slot defines a first annular concave surface with concentric facing portions. The first annular concave surface has a first annular concave high-conductivity, low-permeability layer thereon. The box-end includes a first coil located between concentric facing portions of the first high-conductivity, low-permeability layer. The pin-end defines an external thread and an annular inner contacting pipe end with a second slot. The second slot defines a second annular concave surface with concentric facing portions. The second annular concave surface has a second annular concave high-conductivity, low-permeability layer thereon. The pin-end includes a second coil located between concentric facing portions of the second high-conductivity, low-permeability layer.

The first high-conductivity, low-permeability layer constitutes a first high-conductivity, low-permeability shaped belt that partially encloses the first coil. It is shaped to cooperate with the second high-conductivity, low-permeability shaped belt of an adjacent second pipe joint having a second coil and a second high-conductivity, low-permeability shaped belt to create a closed high-conductivity, low-permeability toroidal path. This closed path encloses the first coil and the second coil when the first and second pipe joints are locked together as part of an operational pipe string.

The first preferred embodiment includes a dual-contact pipe joint with first and second inductive coupler elements located at an inner shoulder and an inner pipe end, respectively. The dimensions of the pipe joint are such that the distance between the outer pipe end and the inner shoulder, is greater than the distance between the outer shoulder and the inner pipe end, by a small amount. When two pipe joints are properly tightened (i.e. forced together with the torque needed to achieve proper pipe-sealing of an outer end against an outer shoulder of an adjacent wired pipe), this small amount allows that same torque to automatically tighten the inner shoulder against the inner pipe end of an adjacent wired pipe joint so as to reliably form a closed high-conductivity, low-permeability toroidal path.

BRIEF DESCRIPTION OF THE DRAWINGS

FIG. 14 shows wired pipe joint 510 and portions of two adjacent wired pipe joints to illustrate an inductive coupler according to the fifth embodiment.

DETAILED DESCRIPTION

General

The invention provides a robust, low-loss wired pipe joint for service as a component of a wired pipe string of the type used in oil well drilling and oil well operations. Such wired pipe strings are used to transmit measurement data to a surface station from locations in a borehole. The wired pipe joint of the preferred embodiment includes two current-loop inductive coupler elements, one at each end of the wired pipe joint, each element including an electromagnetic coil partially enclosed by an annular concave high-conductivity, low-permeability conductive layer. When two wired pipe joints are locked together as part of an inductive coupler of an operational pipe string, the two facing conductive layers cooperate to make a high-conductivity, low-permeability portion of a closed toroidal path enclosing the two coils of the facing ends of the two wired pipe joints. The conductive layers reduce signal energy losses over the length of the drill string by reducing resistive losses and flux losses at each inductive coupler. The wired pipe joint is robust in that it remains operational in the presence of gaps in the conductive layer.

Figure 1:
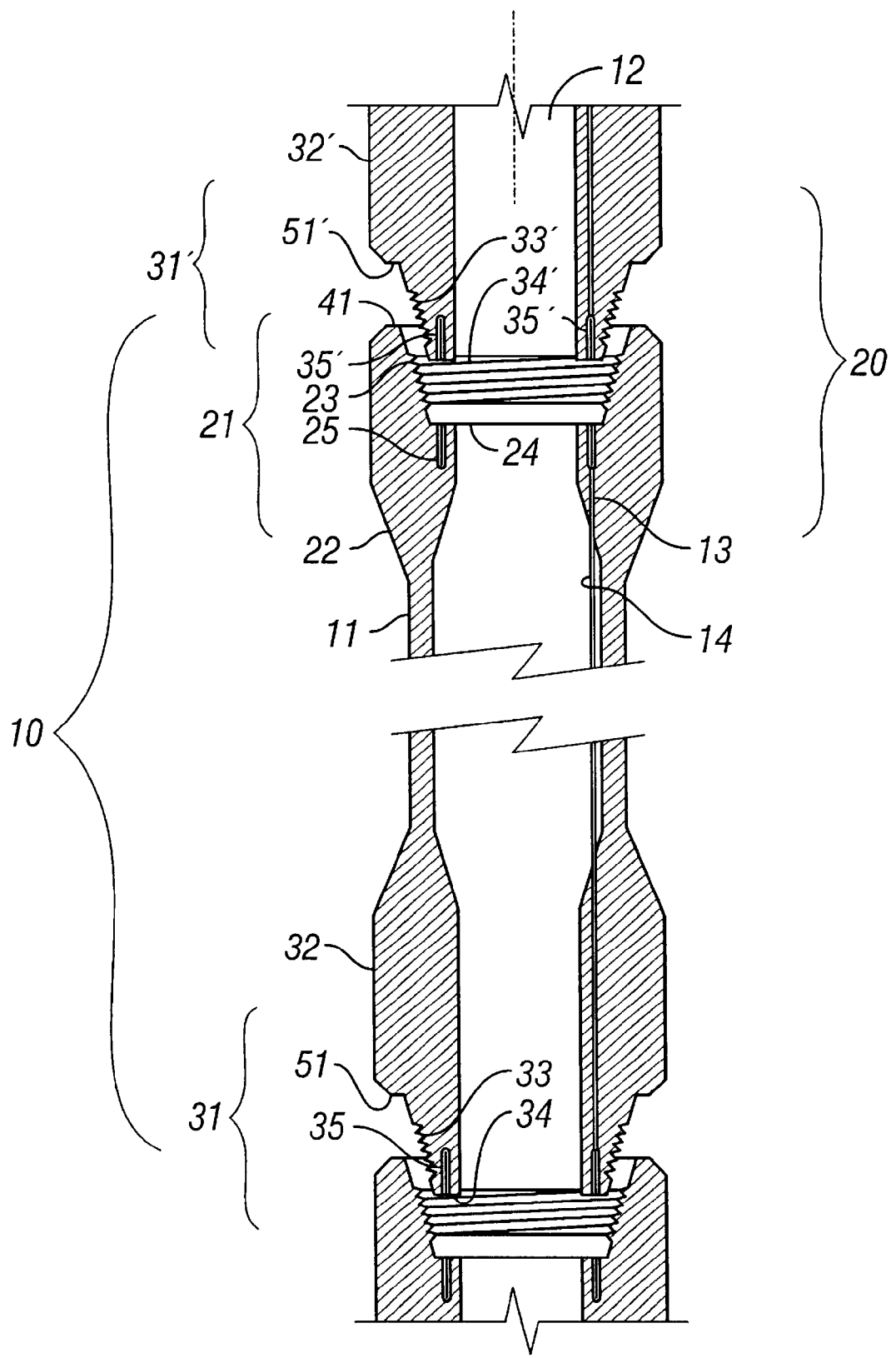
FIG. 1 is a cross section view of a first preferred embodiment of a wired pipe joint according to the present invention having two current-loop inductive coupler elements. A wired pipe joint and portions of two adjacent wired pipe joints are shown to illustrate an inductive coupler according to the preferred embodiment.

In the first preferred embodiment of FIG. 1, two current-loop inductive coupler elements are mounted one at each end of the pipe at an internal shoulder. In the second embodiment shown in FIG. 9, each inductive coupler element includes a beryllium-copper contact and an electrically-insulating spacer. In the third embodiment shown in FIG. 10, one inductive coupler element includes a threaded annular conductive enclosure. In the fourth embodiment shown in FIG. 11, a portion of each inductive coupler element is located within the axial bore. In the fifth embodiment shown in FIG. 14, a first current-loop inductive coupler element is mounted at a box end of the drill pipe in a tapered portion near an external sealing pipe end, and a second current-loop inductive coupler element is mounted at a pin end of the drill pipe in a tapered portion near an external sealing shoulder.

First Preferred Embodiment

Figure 4:
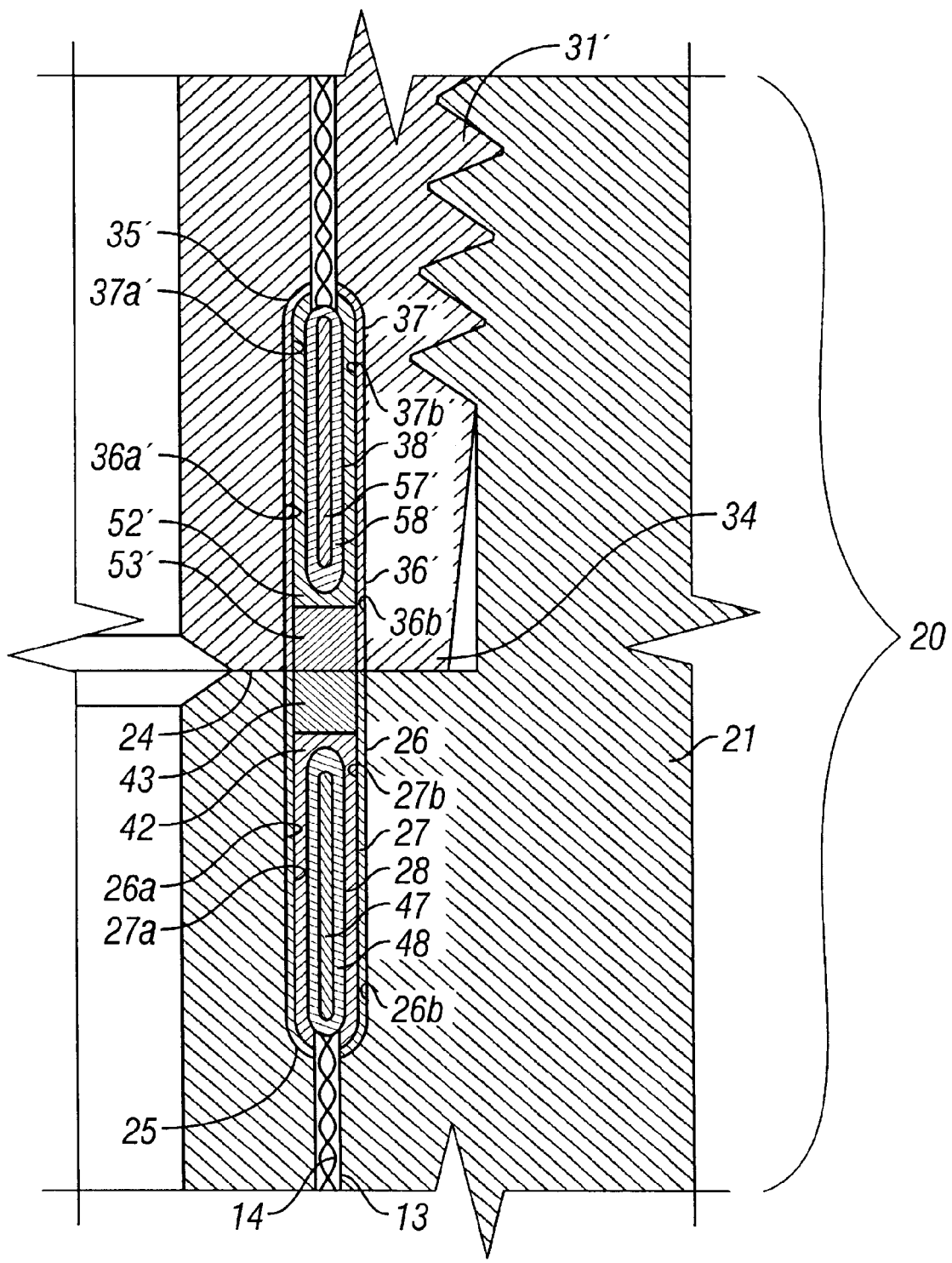
FIG. 4 is an enlarged cross section view showing more detail of the mounting of the electromagnetic components of the current-loop inductive coupler elements of FIG. 3.
Figure 5:
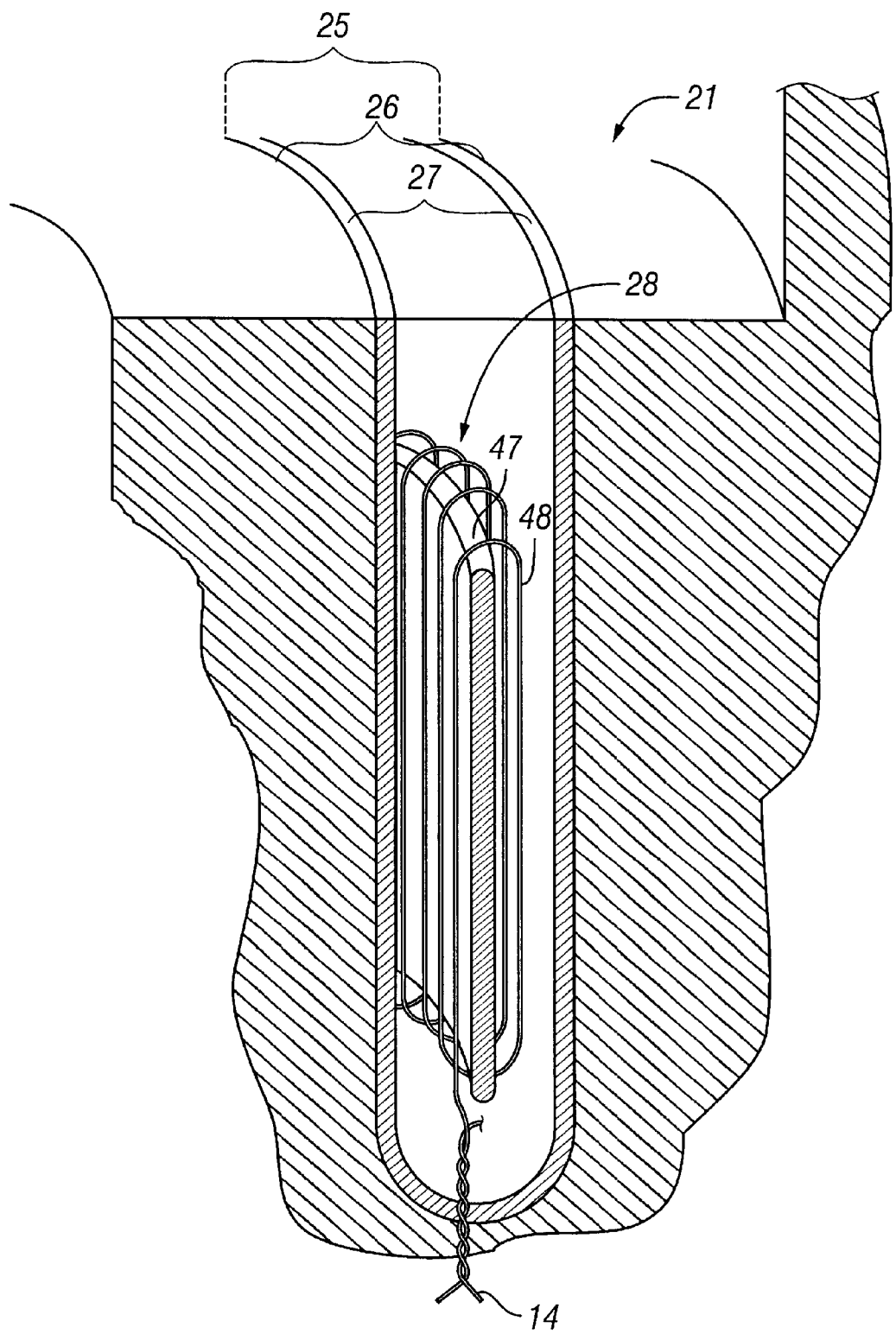
FIG. 5 is an enlarged partially cut-away perspective view of the box-end current-loop inductive coupler element of FIG. 4, showing detail of the coil and the internal electrical cable.
Figure 6A:
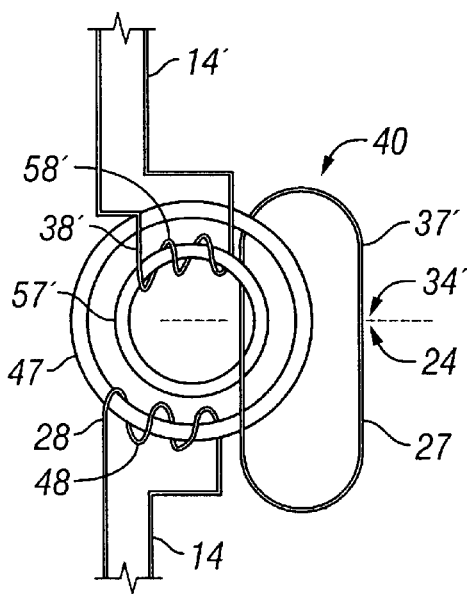
FIG. 6A is an electromagnetic model of the wired pipe joints shown in FIG. 1.
Figure 6A:
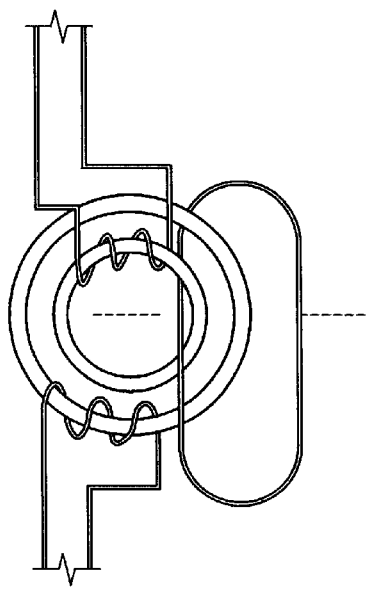

The first preferred embodiment is shown physically in FIGS. 1–5, and schematically in FIG. 6A.

FIG. 1 shows wired pipe joint 10 having a first current-loop inductive coupler element 21, and a second current-loop inductive coupler element 31, one at each end of the pipe. FIG. 1 also shows wired pipe joint 10 including an elongate tubular shank 11 with an axial bore 12, a first inductive coupler element 21 at box-end 22, and a second inductive coupler element 31 at pin-end 32. Inductive coupler 20 is shown as constituted by first inductive coupler element 21 and second inductive coupler element 31' of pin-end 32' in an adjacent wired drill pipe.

Figure 2:
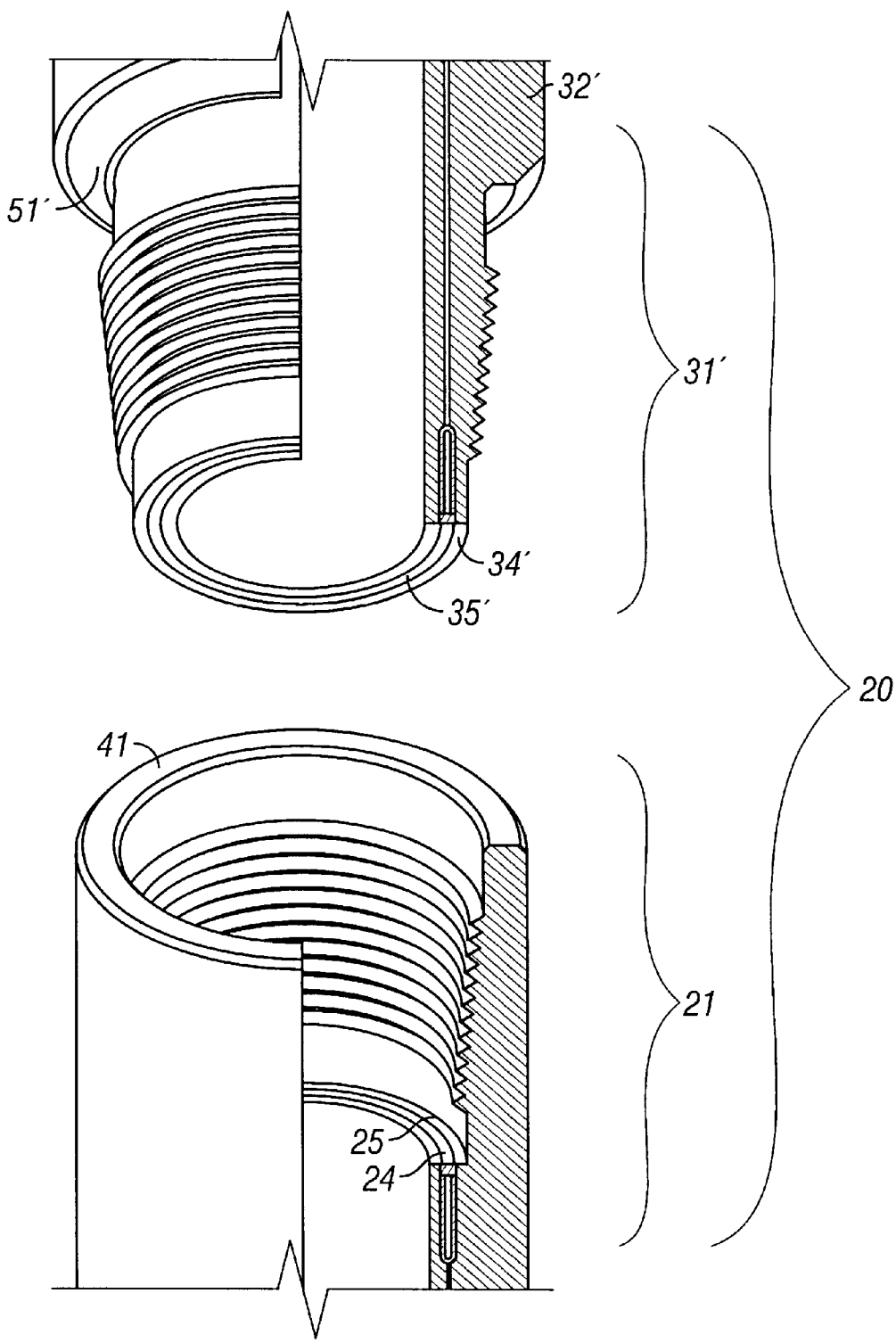
FIG. 2 is a partially cut-away perspective view of a facing pair of current-loop inductive coupler elements of FIG. 1.

FIGS. 1 and 2 show box-end 22 defining internal thread 23, and annular inner contacting shoulder 24 with a first slot 25. FIGS. 1 and 2 also show pin-end 32' of an adjacent wired pipe joint defining external thread 33', and annular inner contacting pipe end 34' with a second slot 35' (Herein below, and in the drawings, an item number followed by a superscript slash "'" indicates an item belonging to an adjacent wired pipe joint).

Figure 3:
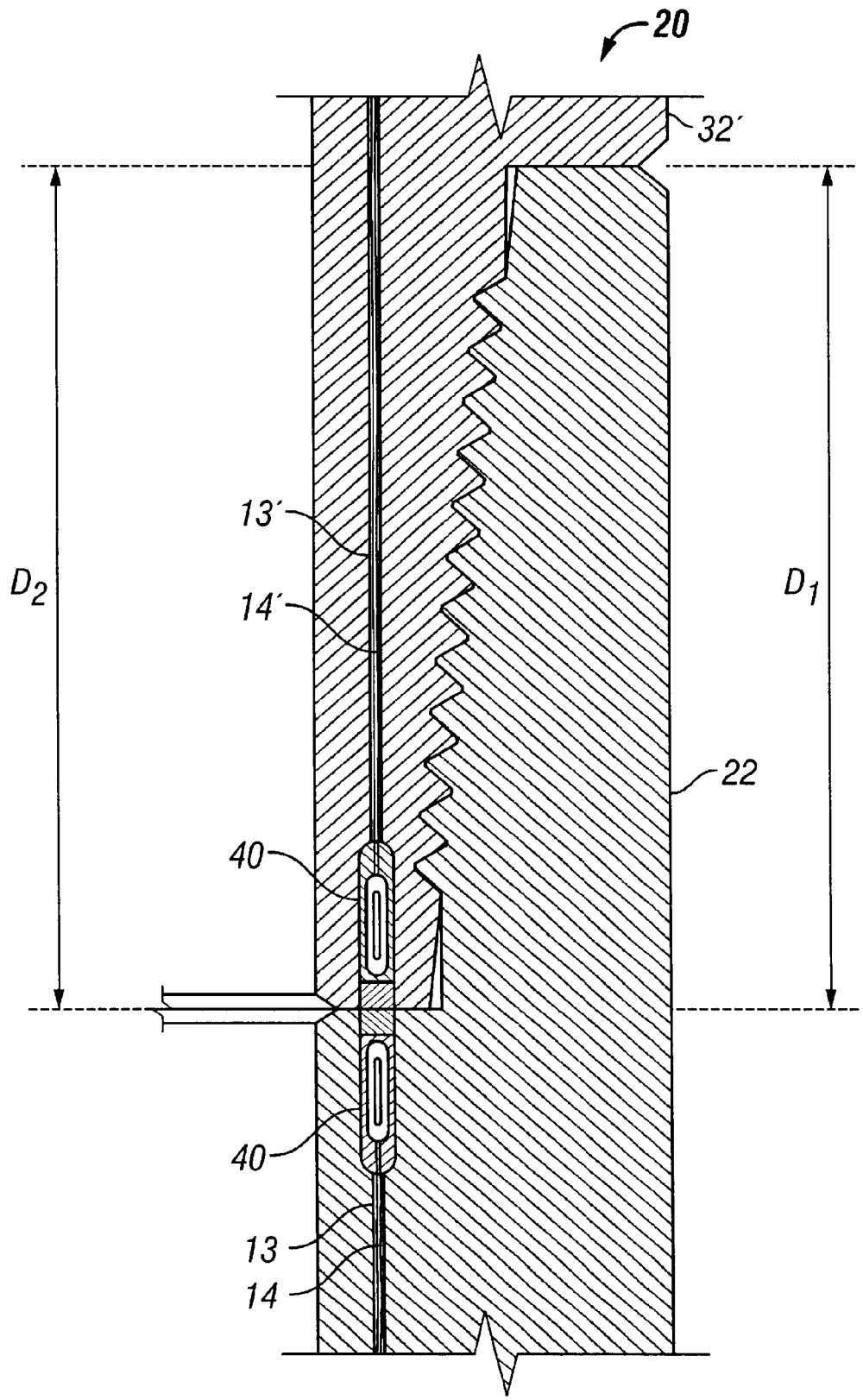
FIG. 3 is a cross section view of the facing pair of current-loop inductive coupler elements of FIG. 2 locked together as part of an operational pipe string, including a cross section view of the closed high-conductivity, low-permeability toroidal path enclosing both cores.

FIG. 3 is a cross section view of the facing pair of current-loop inductive coupler elements of FIG. 2 locked together as part of an operational pipe string. It provides a cross section view of the closed high-conductivity, low-permeability toroidal path 40 enclosing both cores, and a cross section view of conduit 13. Conduit 13 forms a passage for internal electrical cable 14 that electrically connects the two inductive coupler elements of wired pipe joint 10.

FIG. 4 is an enlarged cross section view showing the mounting of first coil 28, first high-permeability core 47 and first coil winding 48. FIG. 4 also shows conduit 13 enclosing internal electrical cable 14. (For clarity of illustration in FIGS. 4 and 5, first coil 28 is shown larger, as compared to pin dimensions, than it would be in a preferred embodiment, where drill pipe strength may not be compromised).

FIG. 4 further shows first slot 25 defining a first annular concave surface 26 with concentric facing portions 26a and 26b. First annular concave surface 26 has a first annular concave high-conductivity, low-permeability layer 27 thereon. Layer 27 defines a first annular cavity. Box-end 22 includes first coil 28 fixedly mounted in the first annular cavity between concentric facing portions 27a and 27b of first layer 27.

FIG. 4 further shows second slot 35' defining a second annular concave surface 36 with concentric facing portions 36a' and 36b'. Second annular concave surface 36' has a second annular concave high-conductivity, low-permeability layer 37' thereon. Layer 37' defines a second annular cavity. Pin-end 32' includes a second coil 38' fixedly mounted in the second annular cavity between concentric facing portions 37a' and 37b' of second layer 37'.

FIG. 4 also shows first current-loop inductive coupler element 21 including first high-conductivity, low-permeability layer 27, and second current-loop inductive coupler element 31' including second high-conductivity, low-permeability layer 37'. Each layer is coated onto or attached to the inner surface of its slot. First coil 28 is located between concentric facing portions 27a and 27b of first layer 27. Thus, the first high-conductivity, low-permeability shaped layer (or belt) 27 partially encloses first coil 28. Likewise, second high-conductivity, low-permeability layer (or belt) 37' partially encloses second coil 38'.

First coil 28 is fixed in place within its slot by potting material 42. First 28 coil is further protected by protective filler material 43, preferably RTV. Similarly, second coil 38' is fixed in place within its slot by potting material 52', and is further protected by protective filler material 53

FIG. 5 is an enlarged cross section view of the box-end current-loop inductive coupler element of FIG. 4 showing detail of first coil 28, including first high-permeability core 47, and first coil winding 48. Core 47 has an axially elongated cross section. Second coil 38', second core 57' and second coil winding 58' of FIG. 4 are similarly structured.

Coil winding 48 preferably has a large number of turns. In the first preferred embodiment, the number is approximately 200. The box-end belt of FIG. 5 is positioned to cooperate with the second high-conductivity, low-permeability pin-end belt of an adjacent second pipe joint to create closed high-conductivity, low-permeability toroidal path 40 as shown in FIG. 3. When the first and second pipe joints are locked together as part of an operational pipe string, layers 27 and 37' form path 40. This closed path encloses the first coil and the second coil as illustrated in the schematic drawing of FIG. 6A. It can be seen from FIG. 6A that a low-loss current-loop inductive coupler according to the present invention may be viewed as a pair of transformers connected back to back through path 40.

Each coil induces an electrical current in the pipe joint, primarily along the high-conductivity, low-permeability layer of the pipe joint that overlays the inner surface of the slot. Each layer of conductive material is attached to, or coated onto, the inner surface of the slot surrounding the core.

The high-conductivity, low-permeability layer may be made of any high-conductivity, low-permeability material that has a conductivity that is substantially higher than the conductivity of steel. Suitable high-conductivity, low permeability materials include copper, copper alloys (such as brass, bronze or beryllium copper), silver, aluminum, gold, tungsten, and zinc (and alloys of these materials).

The high-conductivity, low-permeability layer reduces resistive losses over the length of the pipe string by reducing the resistance of toroidal path 40 from what it would be if path 40 passed only through the steel of the pipe joint. The high-conductivity, low-permeability layer also reduces flux losses over the length of the pipe string by reducing magnetic flux penetration into the steel of each wired pipe joint. Although toroidal path 40 is ideally a closed path, it is not essential that path 40 consist entirely of conductive layer because any gap in the conductive layer of a path 40 would be bridged by the steel of the local pipe-end. A gap in the conductive layer of a toroidal path could be produced by wear on a relatively soft conductive layer near the contact point of the hard steel of contacting pipe ends. A few such gaps in the conductive layer of a toroidal path over the length of the pipe string would not introduce sufficient energy losses to have a significant effect.

Figure 6B:
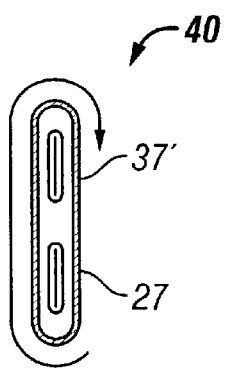
FIG. 6B is a cross section view of the toroidal path of the first preferred embodiment.
Figure 6C:
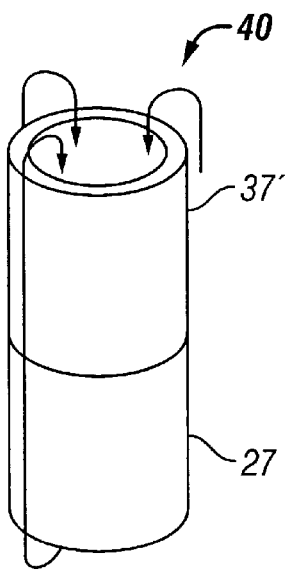
FIG. 6C is a perspective view of the toroidal path of the first preferred embodiment.
Figure 6D:
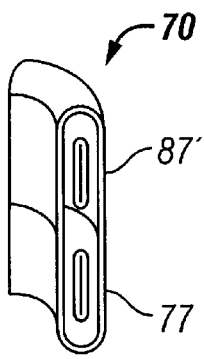
FIG. 6D shows a closed high-conductivity, low permeability segment path.

Toroidal path 40 is shown in cross section view in FIG. 6B. Current flows around path 40 in the plane of the cross section, that is, in a plane aligned with the axis of the pipe bore. Current flow is shown in the arrows in FIGS. 6B and 6C. Ideally, there is no gap between conductive layers 27 and 37' where annular inner contacting shoulder 24 abuts annular inner contacting pipe end 34'. Because current flows in a closed loop oriented in a plane aligned with the axial bore, the layer of high-conductivity, low permeability material that constitutes path 40 may be made of one or more "pie-cut" segment layers, such as shown in FIG. 6D. FIG. 6D shows closed high-conductivity, low permeability segment path 70 comprising first and second segment layers 77 and 87', respectively. While in its simplest form "toroidal path" suggests an unbroken continuous surface, the high-conductivity, low permeability layer could be made of one or more shaped segments because current does not need to flow around the major circumference of the toroidal path.

Each current-loop inductive coupler includes a coil winding, preferably having approximately two hundred turns of wire. In the preferred embodiment, the windings are potted in protective material to help protect them from the environment.

Each coil is operated within a preferred frequency range 10 kHz to 2 MHz, and preferably at a frequency of 300 kHz. Frequencies outside this range could be used up to the limits imposed on the pass-band by the specific system.

The layer of high-conductivity, low permeability material is attached or plated to the surfaces of the grooves surrounding the two coils. This reduces the resistance to the electrical current that links the two cores. It also prevents the magnetic field from penetrating into the pipe material, thereby increasing the efficiency of the coupler. In some embodiments tested by the inventors, attenuation has been reduced to less than 0.2 dB per coupler. The high-conductivity, low-permeability layer need only be a few skin depths thick at the lowest frequency of operation (about 1 mm for one embodiment). The high-conductivity, low-permeability layer is preferably formed by electroplating. Alternatively, it may be formed by electro-forming, explosive-forming, or other method known in the art. Preferably, the cavity in which the coil is placed is designed to minimize the path length along the surfaces in a plane passing through the bore axis.

The magnetic core material is chosen to minimize the hysteresis and eddy current losses and to withstand the downhole environment. Magnetic tape materials available under the names Supermalloy and Metglas® have been found to be suitable, though other materials might be used. Supermalloy is available from Magnetics®, a Division of Spang and Company, East Butler, Pa., USA. Metglas® is available from Honeywell Amorphous Metals, Morristown, N.J., USA.

The cores are preferably formed by winding the magnetic tape material on a mandrel, annealing, and impregnating with epoxy. The mandrel is then removed to maximize the core cross section. In order to minimize flux leakage, the coil windings are preferably wound densely around the core, with minimal separation between turns. This is achieved through the use of closely wound round wire or flat wire. However, other techniques may be used, including depositing the winding by plating or sputtering (the insulating spiral being obtained by masking or etching), or by a flexible printed circuit board construction. Additional capacitors can be installed and connected in parallel with the primary windings to reduce the resonant frequency.

Internal electrical cable 14 in each of FIGS. 1–4 extends axially within at least a portion of the bore. Cable 14 is shown in FIG. 1 contained within conduit 13 in the region of first inductive coupler element 21, but then passes through the bore of the pipe en route, secured to the inner wall of the pipe, to second inductive coupler element 31. Alternatively, cable 14 could be located in a groove cut into the outer surface of the pipe joint. Or cable 14 could be in a gun drill hole within the length of the pipe joint wall. Or it could be within the pipe bore of the pipe joint as a secured cable, an armored cable, or (less desirably) as loose wires.

The reliability of the current-loop inductive coupler system could be improved by introducing redundant cables. Two pairs (or more) of wires could be run from end to end on each joint and two independent coil windings could be wound in each coupler, so that a single broken wire would not cause a system failure. If the wires are independently insulated, shorting one of them to mass would not bring down the system.

The first preferred embodiment includes a dual-contact pipe joint with first and second inductive coupler elements located at an inner shoulder and an inner pipe end, respectively. The dimensions of the pipe joint are such that the distance between the outer pipe end and the inner shoulder, is greater than the distance between the outer shoulder and the inner pipe end, by a small amount. FIG. 3 shows a distance $D_1$ between outer pipe end 41 and annular inner contacting shoulder 24, and distance $D_2$ between outer shoulder 51' and annular inner contacting pipe end 34'.

Distance $D_2$ is greater than distance $D_2$ by a small amount. When two pipe joints are properly tightened (i.e. forced together with the torque needed to achieve proper pipe-sealing of end 41 against shoulder 51' of an adjacent wired pipe), then this small amount allows that same torque to automatically tighten inner shoulder 24 against inner pipe end 34' of an adjacent wired pipe joint so as to reliably form a closed high-conductivity, low-permeability toroidal path 40.

First Variation of the First Embodiment

Figure 7:
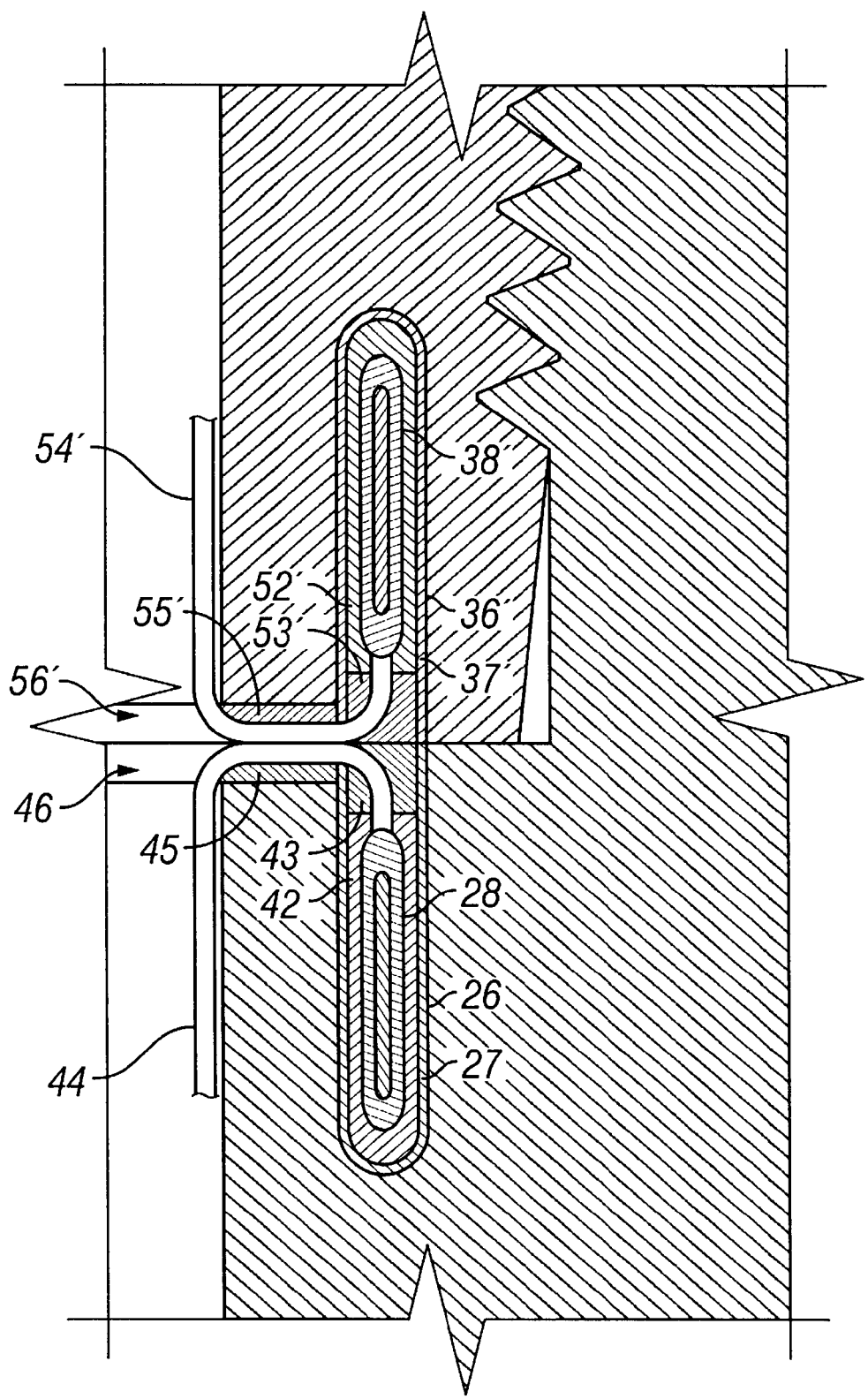
FIG. 7 is an enlarged partially cut-away perspective view showing a first variation of the first embodiment with an alternative location of the cable connection.

FIG. 7 shows a first variation of the first embodiment in which internal cables 44 and 54' exit the area of coils 28 and 38', via annular notches 46 and 56', respectively. Note that the location and structure of potting material 42 and protective filler material 43 and 45 in the box-end, and potting material 52' and protective filler material 53' and 55' in the pin-end, differ from those of the equivalent items in the first embodiment as shown in FIG. 4.

Second Variation of the First Embodiment

Figure 8:
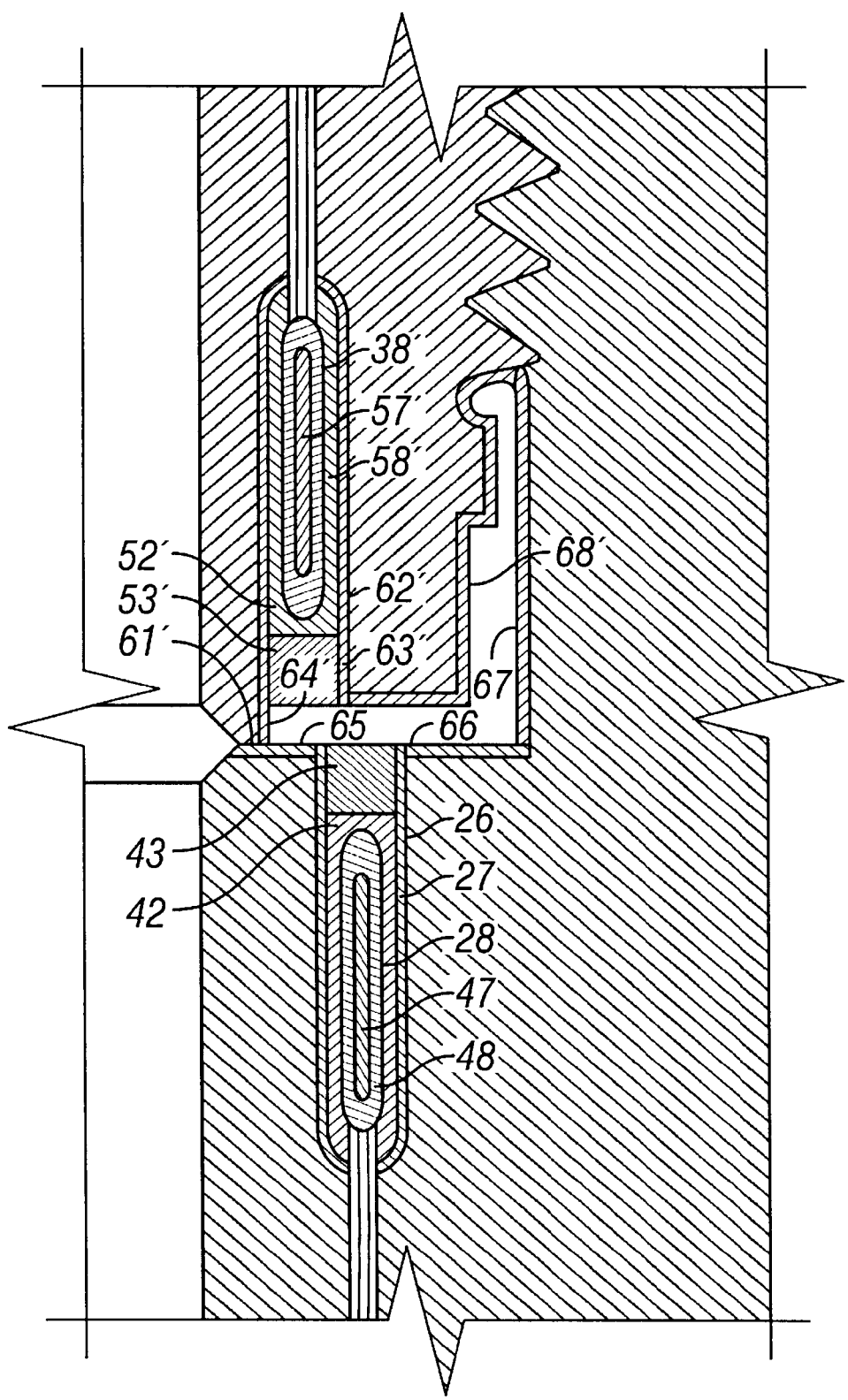
FIG. 8 is an enlarged cross section view showing a second variation of the first embodiment with a first alternative location of the electromagnetic components.

FIG. 8 shows a second variation of the first embodiment having radially offset coils 28 and 38'. Box-end layers 65, 27, and 66–67, and pin-end annular layers 63' and 68', provide high-conductivity, low-permeability material to better close toroidal path 40.

Third Variation of the First Embodiment

In a third variation of the first embodiment, similar to the embodiment of FIG. 8, portions of the high-conductivity, low-permeability annular layers are omitted, for example, layers 67 and 68' in FIG. 8. Accordingly, the conductive layers that constitute closed high-conductivity, low-permeability toroidal path 40 have a gap. So toroidal path 40 includes at least one portion of steel pipe end to bridge the gap.

Second Embodiment

Figure 9:
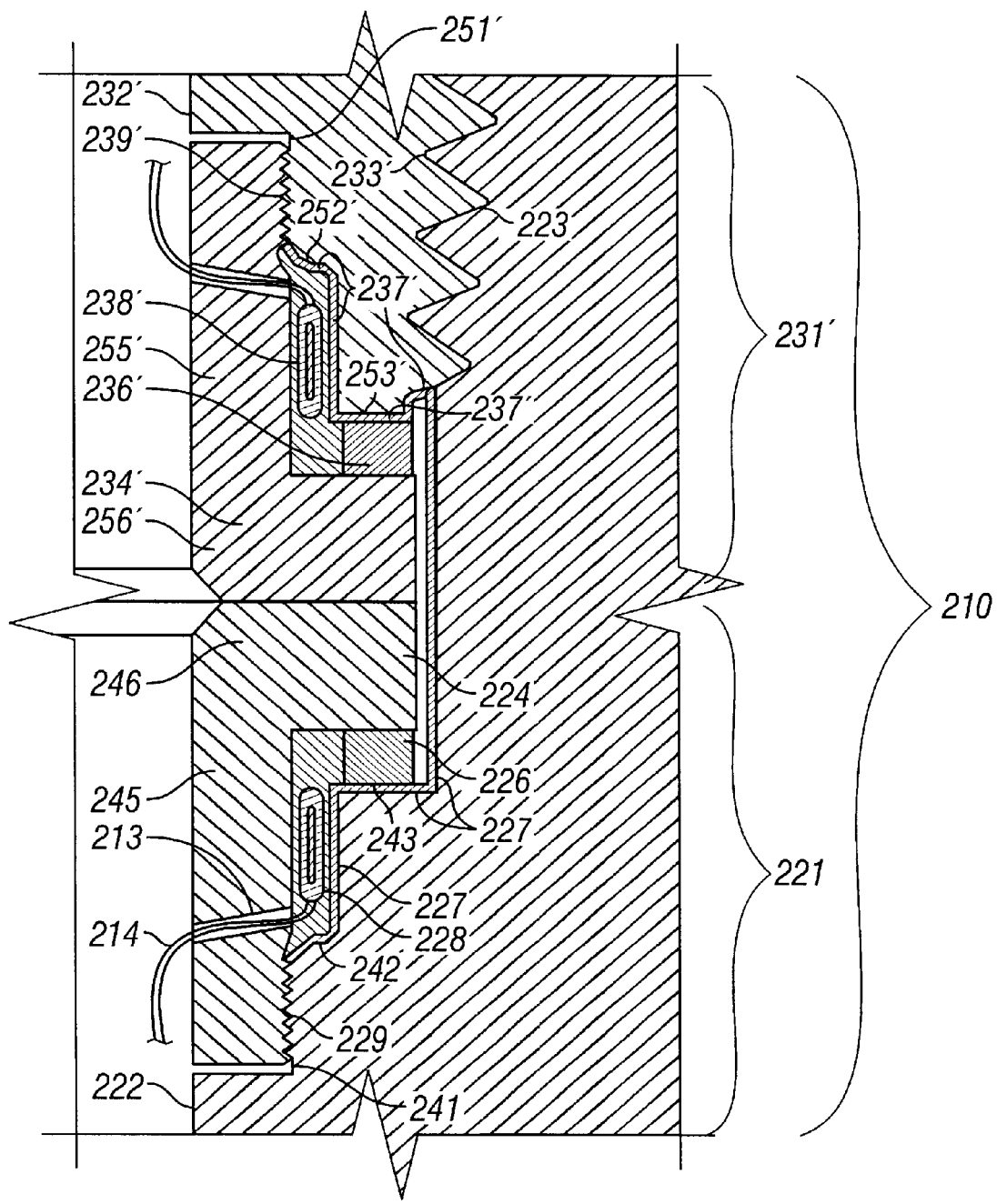
FIG. 9 is a cross section view of the inductive coupler of a second embodiment of a wired pipe joint according to the present invention, each inductive coupler element having a threaded annular conductive enclosure and an annular high-strength electrically-insulating spacer.

FIG. 9 is a cross section view of inductive coupler 210 of a second embodiment of a wired drill pipe according to the present invention. In this embodiment, inductive coupler element 221, and inductive coupler element 231', each include an annular, threaded, high-conductivity, low-permeability conductive enclosure, an annular electrically-insulating spacer, and optionally at least one annular high-conductivity, low-permeability layer. Each conductive enclosure is preferably made of beryllium-copper. Each spacer is preferably made of ceramic.

Box-end 222 defines an annular sealing outer pipe end (not shown), a first annular innermost inner shoulder 241, a first annular middle inner shoulder 242, a first annular outermost inner shoulder 243, and a first internal thread 223 between the outer pipe end and first annular outermost inner shoulder 243. First coil 228 is mounted at first middle shoulder 242.

Box-end 222 includes first annular threaded conductive enclosure 224, first annular high-strength, electrically-insulating spacer 226, and first annular high-conductivity, low-permeability layer 227. Box-end 222 defines a first internal thread 223 between the outer pipe end and first middle shoulder 242, and a third internal thread 229. First annular threaded conductive enclosure 224, is attached to box-end 222 at third internal thread 229.

First conductive enclosure 224 includes first annular body portion 245 and a first annular rim portion 246, the first rim portion having a larger diameter than the first body portion, the first body portion attached to the box-end at first innermost shoulder 241. First conductive enclosure 224 partially encloses first coil 228, locks coil 228 against first annular middle inner shoulder 242, and locks first annular high-strength electrically-insulating spacer 226 against first annular outermost inner shoulder 243.

First annular high-conductivity, low-permeability layer 227 preferably covers an annular portion of box-end inner wall between first internal thread 223 and third internal thread 229.

Pin-end 232' defines an annular sealing outer shoulder (not shown), a second annular innermost inner shoulder 251', a second annular middle inner shoulder 252', a second pipe end 253', and a second external thread 233' between the outer shoulder and second pipe end 253'. Second coil 238' is mounted at second annular middle inner shoulder 252'.

Pin-end 232' includes second annular threaded conductive enclosure 234', second annular, high-strength, electrically-insulating spacer 236', and second annular high-conductivity, low-permeability layer 237'. Pin-end 232' defines a second internal thread 233', between the outer pipe end and the inner shoulder, and a fourth internal thread 239'. Second annular threaded conductive enclosure 234', is attached to pin-end 232' at fourth internal thread 239'.

Second annular threaded conductive enclosure 234' includes second annular body portion 255' and a second annular rim portion 256', the second rim portion having a larger diameter than the second body portion, the second body portion attached to the pin-end at second innermost shoulder 251'. Second conductive enclosure 234' partially encloses second coil 238', locks coil 238' against annular middle shoulder 253', and locks second annular high-strength electrically-insulating spacer 236 against second pipe end 253'.

Second annular high-conductivity, low-permeability layer 237' preferably covers an annular portion of pin-end inner wall between second internal thread 233' and fourth internal thread 239'.

Electrical cable 214 electrically couples coil windings on the first and second coils of a single wired drill pipe. Cable 214 exits box-end 222 via conduit 213. Cable 214 exits pin-end 232' via a second conduit in like manner.

Third Embodiment

Figure 10:
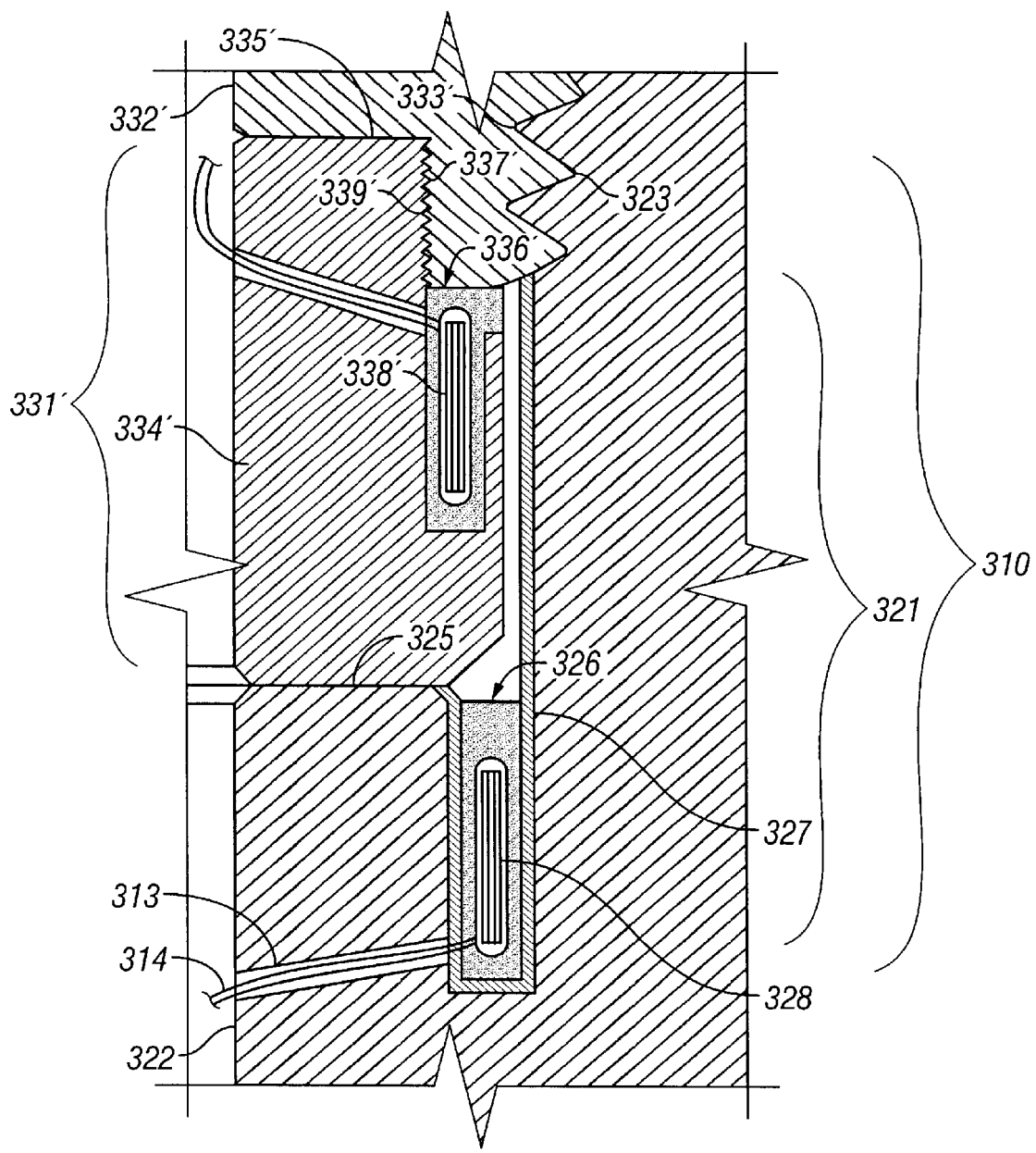
FIG. 10 is a cross section view of the inductive coupler of a third embodiment of a wired pipe joint according to the present invention, one inductive coupler element having a threaded annular conductive enclosure, the other inductive coupler element having a high-conductivity, low-permeability layer.

FIG. 10 is a cross section view of inductive coupler 310 of a third embodiment of a wired drill pipe according to the present invention. In this embodiment, first inductive coupler element 321 at box-end 322 includes annular high-conductivity, low-permeability layer 327.

Box-end 322 defines a first internal thread 323 between an outer pipe end (not shown) and annular inner contacting shoulder 325. First coil 328 is fixedly mounted within first annular slot 326. First inductive coupler element 321, at box-end 322, includes first annular high-conductivity, low-permeability layer 327. First layer 327 covers an annular portion of box-end inner wall between first internal threads 323 and annular inner contacting shoulder 325, partially enclosing first coil 328. Pin-end 332' defines a first external thread 333' between an outer shoulder (not shown) and annular inner contacting shoulder 335'. Second coil 338' is fixedly mounted within second annular slot 336'. A threaded annular conductive enclosure 334', screwed to annular inner contacting shoulder 335' at fourth internal thread 339', locates second coil 338' in second annular slot 336'.

Electrical cable 314 electrically couples coil windings on the first and second coils of a single wired drill pipe. Cable 314 exits box-end 332 via a first conduit 313. Cable 314 exits pin-end 333 via a second conduit in like manner.

Fourth Embodiment

Figure 11:
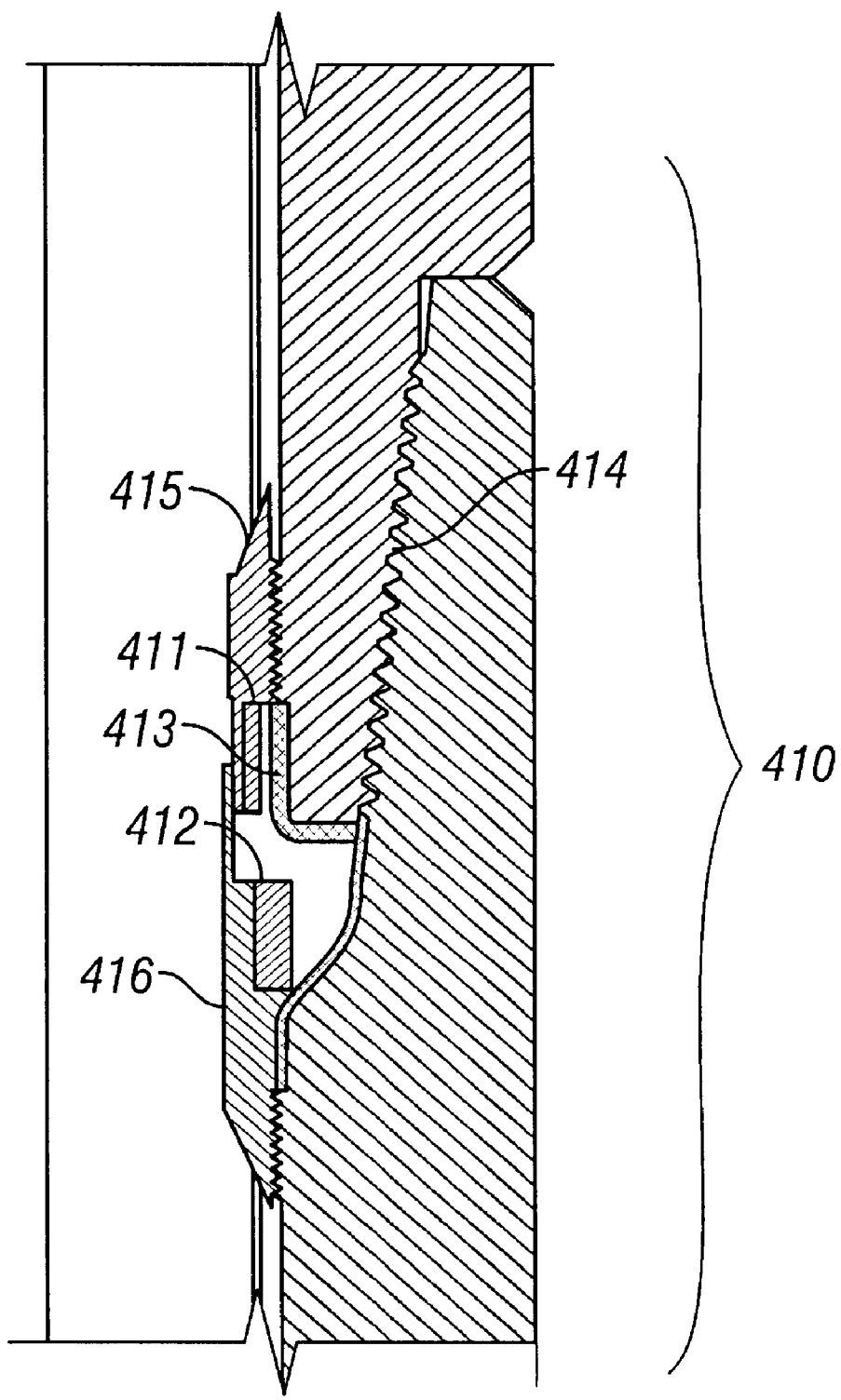
FIG. 11 is a cross section view of the inductive coupler of a fourth embodiment of a wired pipe joint according to the present invention, each inductive coupler element mounted within a tubular support member attached to the interior cylindrical surface of the drillpipe bore.

FIG. 11 is a cross section view of the low-loss inductive coupler 410 of a fourth embodiment of a wired drill pipe according to the present invention, the wired drill pipe having first and second current-loop inductive coupler elements within the pipe joint bore.

In a first version of inductive coupler 410, first coil is mounted to first high-conductivity, low-permeability tubular support member 415. Support member 415 is locally attached to the first pipe joint inside the first pipe joint bore. Likewise, second coil 412 is mounted to second high-conductivity, low-permeability, tubular support member 416. Support member 416 is locally attached to the second pipe joint inside the second pipe joint bore. When the coupler elements are mated, first high-conductivity, low-permeability shaped belt 413, second high-conductivity, low-permeability shaped belt 414, and the two high-conductivity, low-permeability, tubular support members 415 and 416 form a closed high-conductivity, low-permeability toroidal path. This path surrounds both coils, and functionally corresponds to path 40 in FIG. 6A. Support members 415 and 416 could be made of any suitable high-conductivity, low-permeability material such as beryllium copper, or of a magnetic material such as steel with a coating of high-conductivity, low-permeability material.

Figure 12:
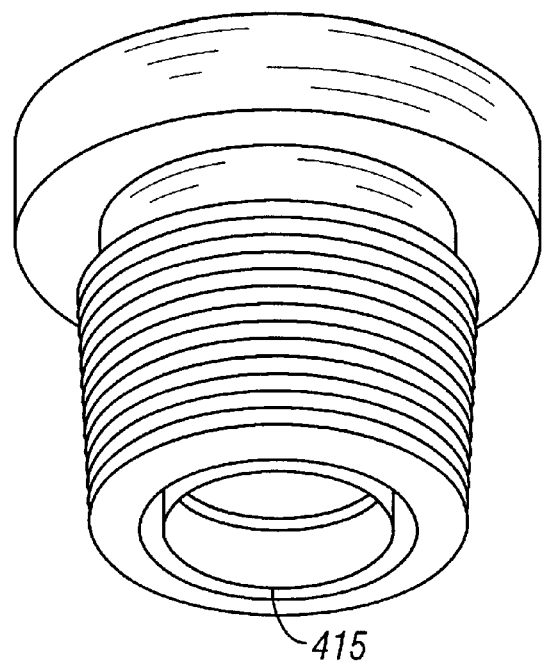
FIG. 12 is a perspective view of a pin-end of a wired pipe joint containing a first current-loop inductive coupler element of the fourth embodiment shown in FIG. 11.
Figure 13:
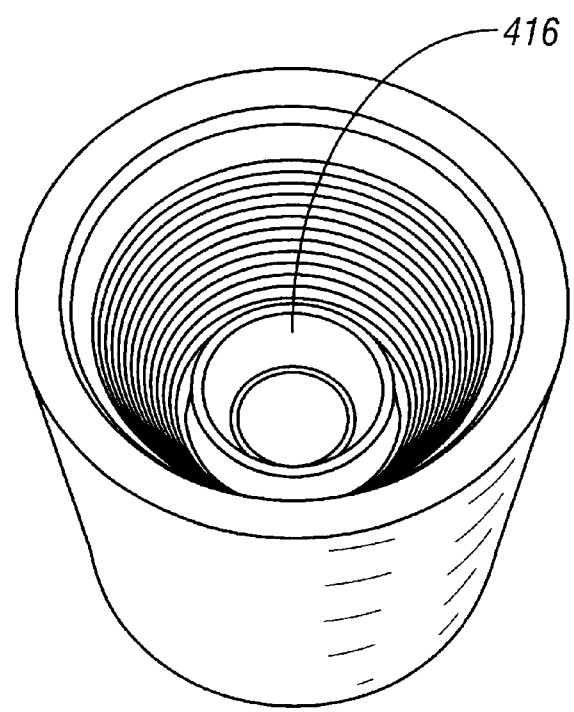
FIG. 13 is a perspective view of a box-end of a wired pipe joint containing a second current-loop inductive coupler element of the fourth embodiment shown in FIG. 11.

FIG. 12 is a perspective view of a pin end of a wired pipe joint containing a first element of the embodiment of FIG. 11. FIG. 13 is a perspective view of a box end of a wired pipe joint containing a second element of the embodiment of FIG. 11.

Fifth Embodiment

Figure 14:
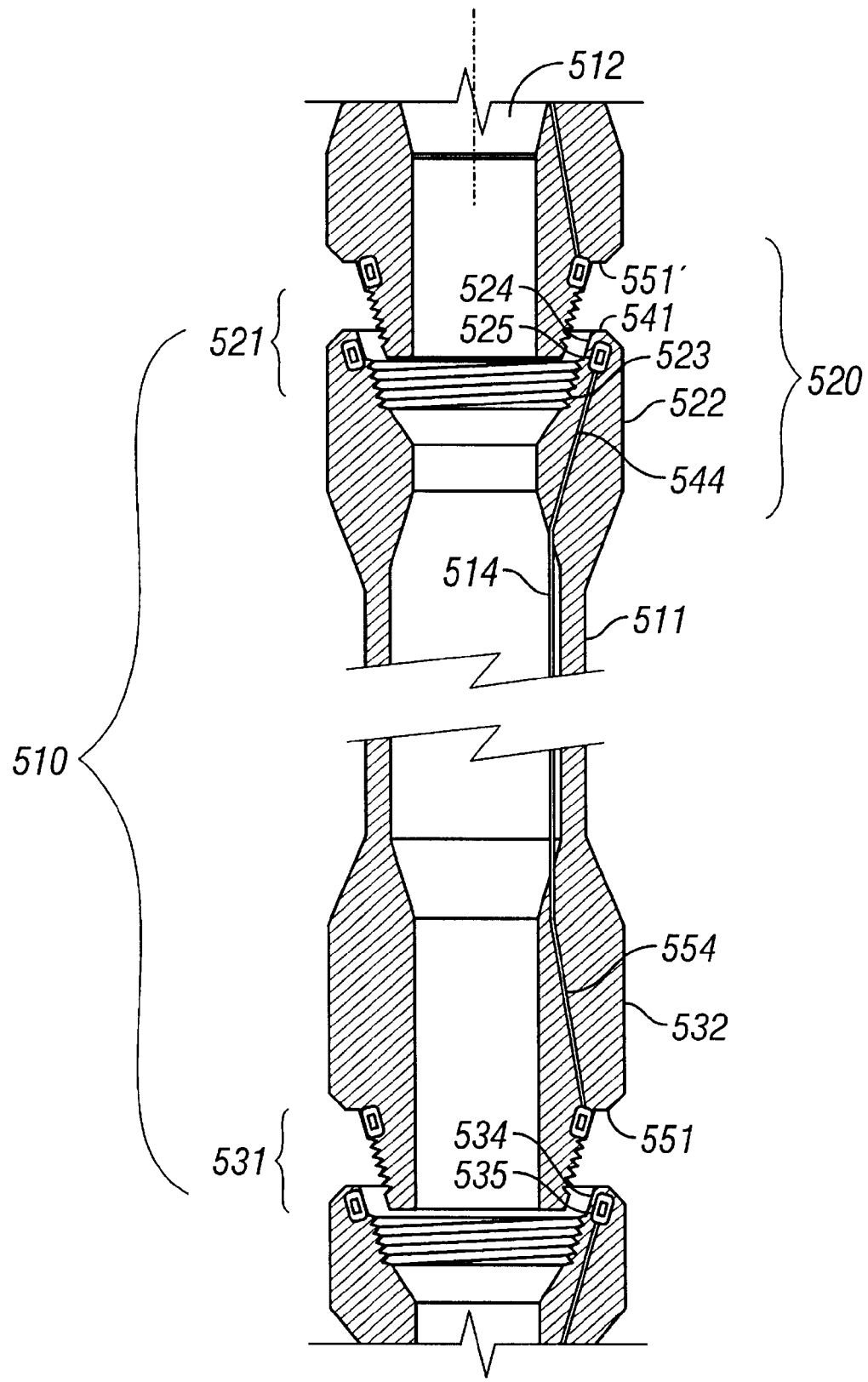
FIG. 14 is a cross section view of a fifth embodiment of a wired pipe joint according to the present invention having two current-loop inductive coupler elements.
Figure 15:
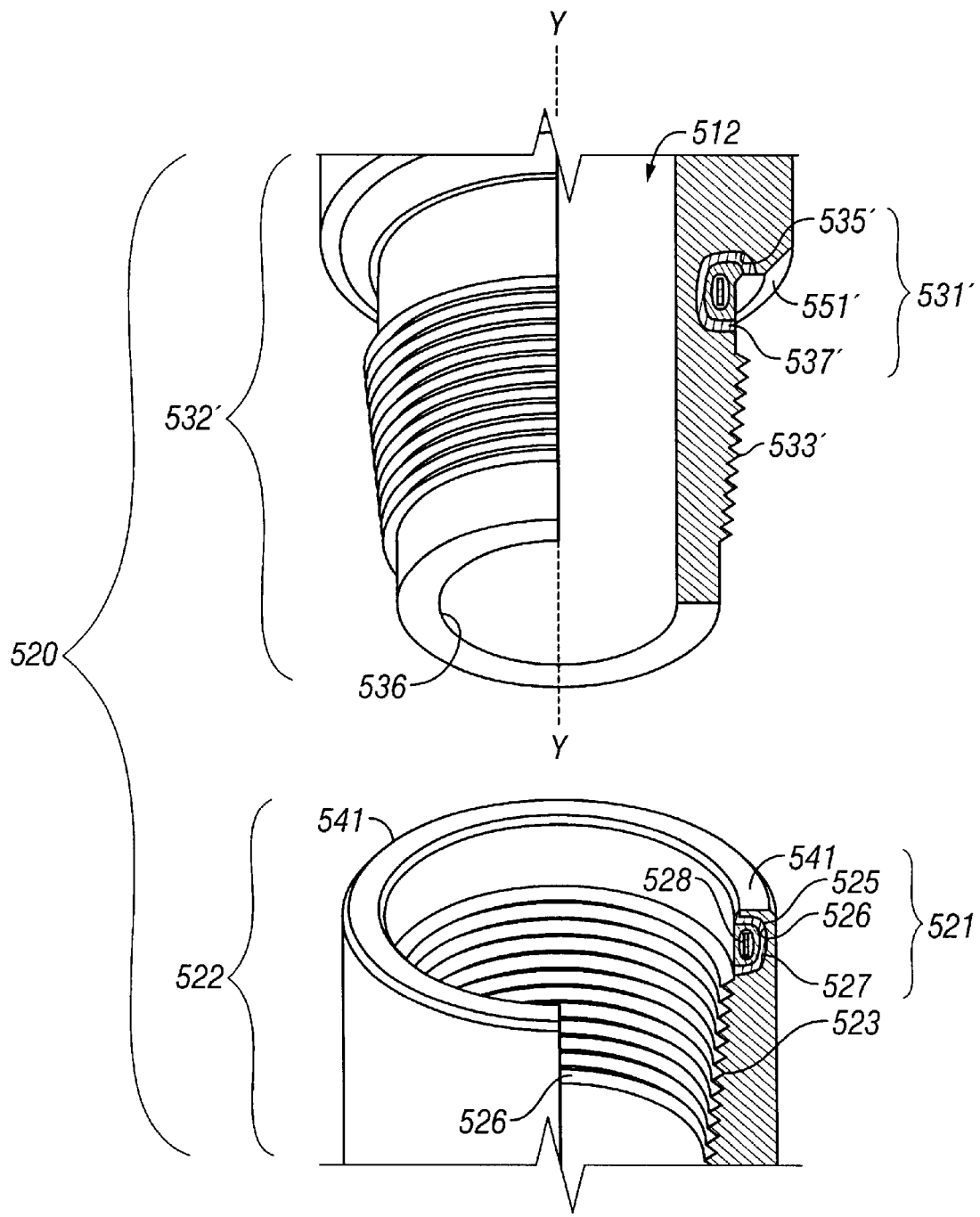
FIG. 15 is a partially cut-away perspective view of a facing pair of current-loop inductive coupler elements of the fifth embodiment shown in FIG. 14.
Figure 16:
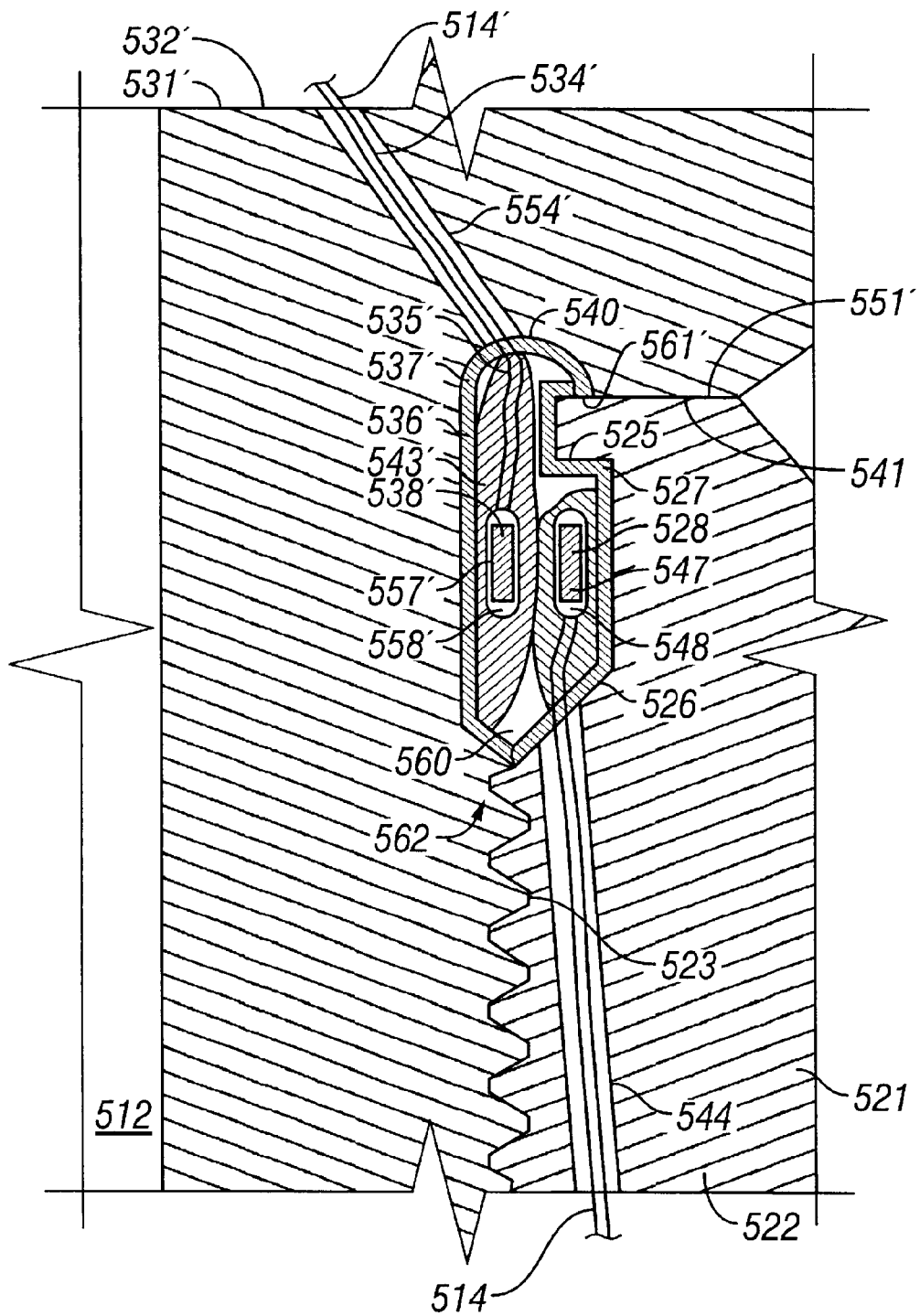
FIG. 16 is a cross section view of the current-loop inductive coupler elements of the fifth embodiment shown in FIG. 14 locked together as part of an operational pipe string, including a cross section view of the high-conductivity, low-permeability path enclosing both cores.

The fifth embodiment is shown physically in FIGS. 14–16, and schematically in FIG. 6A. (Schematically it is very similar to the first preferred embodiment).

FIG. 14 shows wired pipe joint 510 including an elongate tubular shank 511. Shank 511 has a box-end 522 and a pin-end 532. Box-end 522 includes first current-loop inductive coupler element 521 and internal tapered pipe-thread 523. Box-end 522 defines an annular inner-facing, conic-section region 524 with a first shallow slot 525. Pin-end 532 includes second current-loop inductive coupler element 531 and external tapered pipe-thread 533. Pin-end 532 defines an annular outer-facing, conic-section region 534 with a second shallow slot 535. As shown at the top of FIG. 14, box-end 522 couples with the pin-end of an adjacent wired pipe joint to make inductive coupler 520. First current-loop inductive coupler element 521 and second current-loop inductive coupler element 531 are connected electrically by internal electrical cable 514. FIG. 14 also shows outer pipe end 541 and outer shoulder 551 which define sealing faces.

FIGS. 15 and 16 show inductive coupler 520 of the wired pipe joint of FIG. 14 in more detail. FIG. 15 shows box-end 522 including first current-loop inductive coupler element 521 and internal tapered pipe-thread 523. First shallow slot 525 defines a first annular concave surface 526. Likewise, pin-end 532 is shown including second inductive coupler element 531 and external tapered pipe-thread 533. Second shallow slot 535 defines a second annular concave surface 536.

FIG. 16 is an enlarged cross section view of the electromagnetic components of coupled current-loop inductive coupler elements 521 and 531 of FIGS. 14 and 15.

FIG. 16 shows first annular concave surface 526 has a first high-conductivity, low-permeability layer 527 thereon. Box-end 522 includes first coil 528, including first high-permeability core 547 having first coil winding 548 wound thereon. First coil 528 is located in first shallow slot 525, partially enclosed by layer 527. Second annular concave surface 536' has a second high-conductivity, low-permeability layer 537' thereon. Pin-end 532' includes second coil 538', including second high-permeability core 557' having second coil winding 558' wound thereon. Second coil 538' is located within second shallow slot 535', partially enclosed by layer 537'.

Layer 527 constitutes a first high-conductivity, low-permeability shaped belt, partially enclosing first coil 528. This belt is shaped to cooperate with the second high-conductivity, low-permeability shaped belt, partially enclosing second coil 538' of an adjacent second pipe joint, to create a closed toroidal high-conductivity, low-permeability path 540. Closed path 540 encloses the first coil and the second coil when the first and second pipe joints are locked together as part of an operational pipe string.

Internal electrical cable 514 extends axially within at least a portion of the bore of the pipe joint. Cable 514 is shown in FIGS. 14 and 16 passing through box end 522 via first conduit 544 for unsupported passage through the central portion of the bore. Alternatively, cable 514 could be located in a groove cut into the outer surface of the pipe joint. Or cable 514 could be in a gun drill hole within the length of the pipe joint wall. Or cable 514 could pass within the bore of the pipe joint as a secured or armored cable.

A low-loss current-loop inductive coupler according to this fifth embodiment may be viewed as a pair of transformers connected back to back through a high-conductivity, low-permeability toroidal path similar to the path 40 shown in FIG. 6A.

Referring again to FIG. 15, first current-loop inductive coupler element 521 includes first coil 528 surrounding axial bore 512. Second current-loop inductive coupler element 531' includes a second coil 538' also concentric with bore 512. First element 521 includes a portion of first pipe joint connection, proximate to first connection threads, that has a first high-conductivity, low-permeability layer 527 partially surrounding the first coil. Second element 531' includes a portion of second pipe joint connection, proximate to second connection threads, that has a second high-conductivity, low-permeability layer 537' partially surrounding the second coil. First high-conductivity, low-permeability shaped belt is shaped to cooperate with a second high-conductivity, low-permeability shaped belt of an adjacent wired pipe joint. When a first wired pipe joint and an adjacent second wired pipe joint are screwed together for use in a pipe string, the first and second high-conductivity, low-permeability shaped belts create a closed high-conductivity, low-permeability toroidal path enclosing both the first coil of the wired pipe joint, and the second coil of the adjacent wired pipe joint.

As shown in FIG. 16, first coil 528 is located in toroidal cavity 560. Toroidal cavity 560 is defined by the concave surface of first high-conductivity, low permeability layer 527 that covers first annular concave surface 526 and by the concave surface of second high-conductivity, low permeability layer 537' that covers second annular concave surface 536'. First shallow slot 525 (shown in FIG. 15) is formed close to the threads and the sealing faces, and encircles the bore. Within first shallow slot 525, the coils are well protected from the drilling environment. Each coil is preferably hermetically molded with a protective coating of rubber, but other type of polymeric over-molding may be used.

Referring again to FIG. 15, inductive coupler 520 includes first current-loop inductive coupler element 521 that defines a first axis Y—Y, an axial bore 512, and a first outer pipe end 541. It further includes first coil 528. First coil 528 is oriented in a plane transverse to axis Y—Y, surrounding bore 512, and located within first element 521. First element 521 has an external tapered pipe-thread 533', and a first high-conductivity, low-permeability layer 527 partially enclosing first coil 528. First high-conductivity, low-permeability layer 527 is shaped to mate with a complementary second high-conductivity, low-permeability layer 537' of an adjacent pipe joint second end element having a corresponding second electrically conductive coil wound around a second core. The two layers cooperate to create the closed high-conductivity, low-permeability toroidal path 540 similar to path 40 of FIG. 6A. Path 540 encloses both coils when current-loop inductive coupler elements 521 and 531' are coupled. Protective filler materials 553 and 543' surround first and second coils, respectively. Path 540, toroidal cavity 560, seal-region contact rim 561', and thread-region contact rim 562 are shown in FIG. 16.

FIG. 16 shows first current-loop inductive coupler element 521 defining first conduit 544 enclosing internal electrical cable 514. Likewise, second current-loop inductive coupler element 531 defines second conduit 554' enclosing internal electrical cable 514'.

First Variation of the Fifth Embodiment

Figure 17:
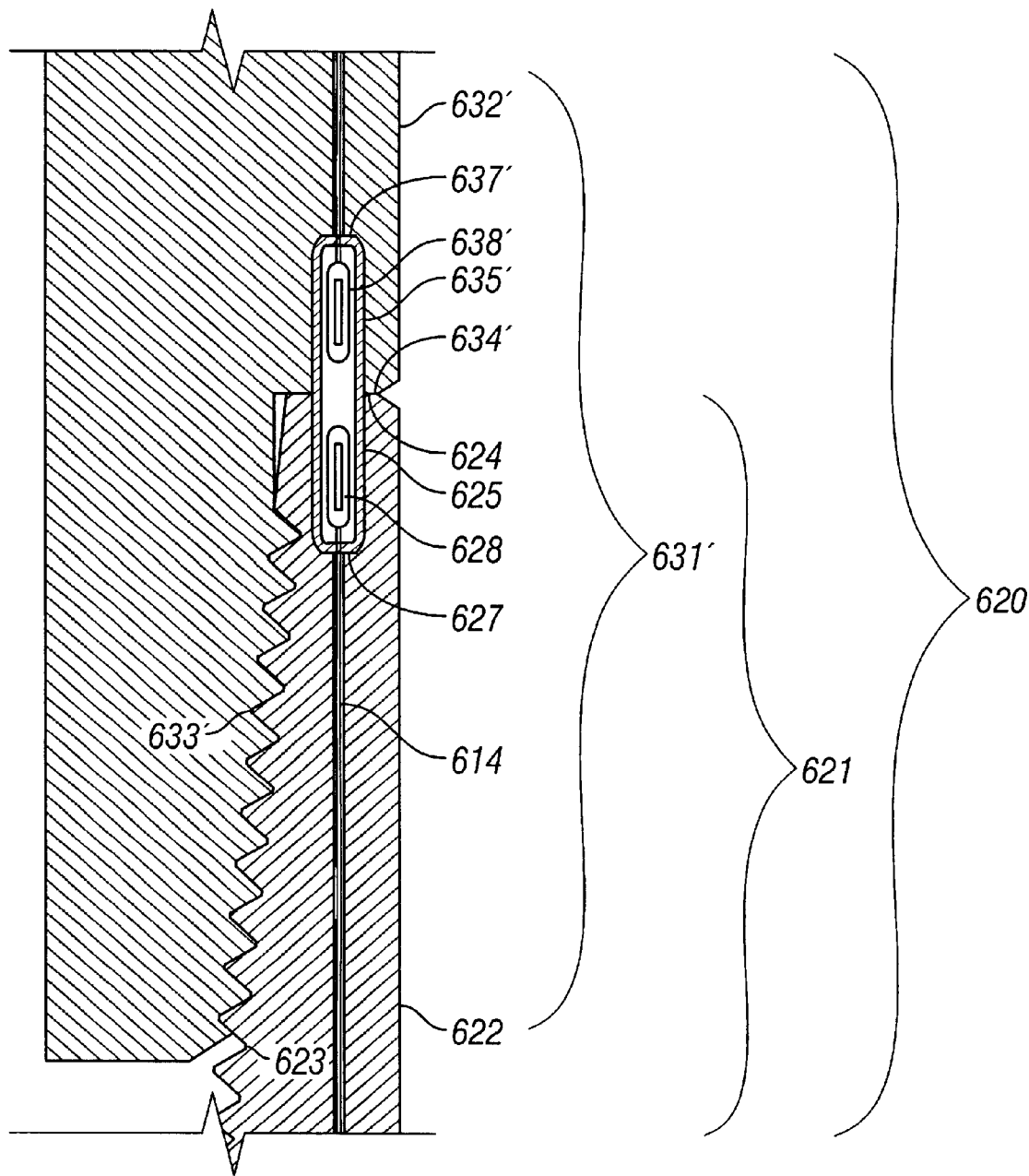
FIG. 17 is an enlarged cross section view showing a first variation of the fifth embodiment with a first alternative location of the electromagnetic components.

FIG. 17 is a cross section view of a first variation of the fifth embodiment. In this variation, first and second cores and first and second high-conductivity, low-permeability layers are located proximate to the sealing faces of the wired pipe joint.

Second Variation of the Fifth Embodiment

Figure 18:
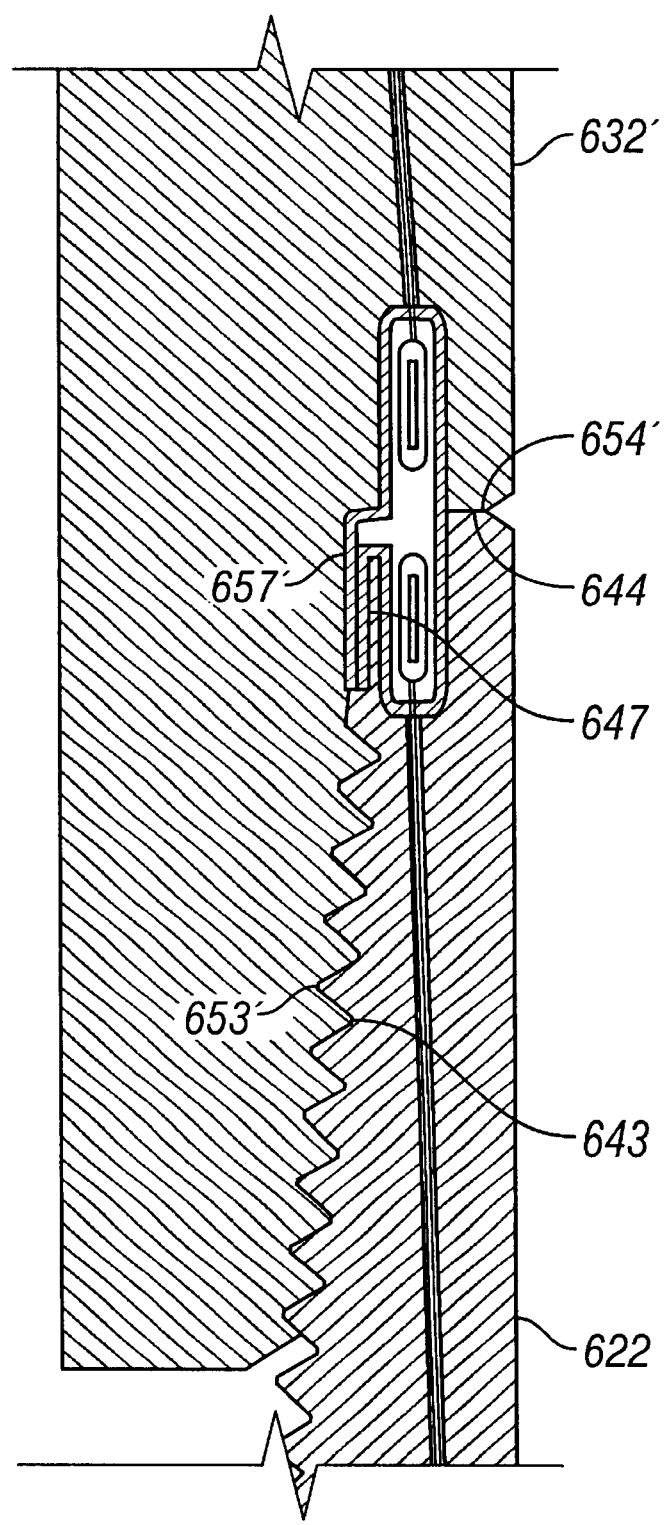
FIG. 18 is an enlarged cross section view showing a second variation of the fifth embodiment with a second alternative location of the electromagnetic components.

FIG. 18 is a cross section view of a second variation of the fifth embodiment, similar to the first variation.

Third Variation of the Fifth Embodiment

In a third variation (not shown) of the fifth embodiment, the wired pipe joint comprises an elongate tubular shank made of a high-conductivity, low-permeability material. The shank defines a first high-conductivity, low-permeability shaped belt at a shank first end, and a second high-conductivity, low-permeability shaped belt at a shank second end.

Fourth Variation of the Fifth Embodiment

A fourth variation of the fifth embodiment provides a wired pipe joint having a shank made of beryllium copper.

Fifth Variation of the Fifth Embodiment

A fifth variation of the fifth embodiment provides a pair of short inductive coupler subs. Each sub has a short shank made out of a metal, and a single inductive coupler element partially enclosed by an annular concave high-conductivity, low-permeability conductive layer. If the shank is made of a high conductivity, low permeability material, such as beryllium copper, the layer is not needed. The fifth variation is not shown but uses components disclosed herein above as part of the fifth embodiment. The inductive couplers are similar to those of the two ends of the fifth embodiment. A first sub would be screwed onto the first end of conventional (non-wired) pipe joint and a second sub would be screwed onto the second end of the pipe joint to make a wired pipe joint assembly (not shown). The two inductive coupler elements of this wired pipe joint assembly could be electrically coupled to each other on site by a cable threaded through the bore of the pipe joint. The use of inductive coupler subs triples the number of threaded joints, but does not increase the number of inductive coupler elements needed for a given drill string. The method of use requires that at least one cable connection be made after the inductive coupler subs are installed.

Sixth Embodiment

The sixth embodiment of a wired pipe joint is shown in cross-section view in FIG. 17, and schematically in FIG. 6A. (Schematically the sixth embodiment is very similar to the first preferred embodiment).

FIG. 17 shows inductive coupler 620 including first current-loop inductive coupler element 621 and second current-loop inductive coupler element 631' of an adjacent wired pipe joint. Box-end 622 defines internal tapered pipe-thread 623, sealing pipe end 624, and first annular slot 625 in sealing pipe end 624. Pin-end 632' defines external tapered pipe-thread 633', sealing shoulder 634', and second annular slot 635' in sealing shoulder 634'. Box-end 622 couples with the pin-end 632' of the adjacent wired pipe joint to make inductive coupler 620.

First annular slot 625 contains a first annular concave high-conductivity, low-permeability layer 627 defining a first annular cavity. First coil 628 is mounted in potting compound within the first annular cavity. Second annular slot 635' contains a second annular concave high-conductivity, low-permeability layer 637' defining a second annular cavity. Second coil 638 is mounted in potting compound within the second annular cavity.

Coil windings of first coil 628 of current-loop inductive coupler element 621 and coil windings of the second current-loop inductive coupler element (not shown) of the wired drill pipe of coupler element 621 are connected electrically by internal electrical cable 614.

In the sixth embodiment, as shown in FIG. 17, sealing pipe end 624 includes inner and outer annular portions separated by first slot 625, and shoulder 634' includes inner and outer annular portions separated by second slot 635'.

In a variation of the sixth embodiment, FIG. 18 illustrates a wired pipe joint having a more robust (not split) sealing pipe end 644 and a more robust shoulder 654'. This variation also includes a third high-conductivity, low-permeability layer 647 over an internal annular face proximate to internal thread 643, and a fourth high-conductivity, low-permeability layer 657' over an external annular face proximate to external thread 653'.

What is claimed is:

1. A wired pipe joint having an axial bore, comprising:
an elongate tubular shank;
a box-end, at a first end of said shank, said box-end defining a contacting annular outer pipe end, a contacting annular inner shoulder, and an internal thread between said outer pipe end and said inner shoulder, said inner shoulder having a first annular slot therein, said first slot containing a first annular concave high-conductivity, low-permeability layer defining a first annular cavity, and a first coil fixedly mounted within said first annular cavity;
a pin-end, at a second end of said shank, said pin-end defining a contacting annular outer shoulder, a contacting annular inner pipe end, and an external thread between said outer shoulder and said inner pipe end, said inner pipe end having a second annular slot therein, said second slot containing a second annular concave high-conductivity, low-permeability layer defining a second annular cavity, and a second coil fixedly mounted within said second annular cavity; and means for electrically coupling coil windings of said first and second coils.

2. A wired pipe joint according to claim 1, wherein said concave layers have concentric facing portions.

3. A wired pipe joint according to claim 2, wherein said concentric facing portions are cylindrical.

4. A wired pipe joint according to claim 1, wherein the axial distance between said outer pipe end and said inner shoulder is approximately equal to the axial distance between said outer shoulder and said inner pipe end.

5. A wired pipe joint according to claim 4, wherein the axial distance between said outer pipe end and said inner shoulder is greater than the axial distance between said outer shoulder and said inner pipe end by an amount sufficient to ensure that the torque required to tighten said inner shoulder against said inner pipe end so as to form a closed high-conductivity, low-permeability toroidal path is equal to the torque required to tighten said outer pipe end against said outer shoulder to achieve proper pipe-sealing.

6. A wired pipe joint according to claim 1, wherein said box-end includes a conduit for passage of said electrical cable through a portion of said box-end.

7. A wired pipe joint according to claim 1, wherein each coil is operated within the frequency range 10 kHz to 2 MHz.

8. A wired pipe joint according to claim 7, wherein each coil is operated at a frequency of approximately 300 kHz.

9. A wired pipe joint according to claim 1, wherein each coil has an axially elongated cross section.

10. A wired pipe joint according to claim 1, wherein each layer includes a material selected from a group of materials, the group consisting of copper, brass, bronze, beryllium copper, silver, aluminum, gold, tungsten, and zinc.

11. A wired pipe joint according to claim 1, wherein each layer is a coating of a material including a material selected from a group of materials, the group consisting of copper, brass, bronze, beryllium copper, silver, aluminum, gold, tungsten, and zinc.

12. A wired pipe joint according to claim 1, wherein said first layer is an insert of a material including a material selected from a group of materials, the group consisting of copper, brass, bronze, beryllium copper, silver, aluminum, gold, tungsten, and zinc.

13. A wired pipe joint according to claim 1, wherein each coil is encapsulated in potting material.

14. A wired pipe joint according to claim 1, wherein at least one of said high-conductivity, low permeability layers includes at least one segment layer.

15. A wired pipe joint according to claim 1, wherein said inner shoulder includes a notch for passage of said electrical cable into said axial bore.

16. A wired pipe joint according to claim 1, wherein said inner pipe end includes a notch for passage of said electrical cable into said axial bore.

17. A wired pipe joint according to claim 1, wherein said first coil and said second coil are radially offset.

18. A wired pipe joint according to claim 1, wherein a gap in high-conductivity, low-permeability layer forming said toroidal path is bridged by a portion of pipe end.

19. An inductive coupler for a wired pipe joint having an axial bore, the inductive coupler comprising:

a box-end of a first a wired pipe joint, said box-end defining a contacting annular outer pipe end, a contacting annular inner shoulder, and an internal thread between said outer pipe end and said inner shoulder, said inner shoulder having a first annular slot therein, said first slot containing a first annular concave high-conductivity, low-permeability layer defining a first annular cavity, and a first coil fixedly mounted within said first annular cavity;

a pin-end of a second wired pipe joint, said pin-end defining a contacting annular outer shoulder, a contacting annular inner pipe end, and an external thread between said outer shoulder and said inner pipe end, said inner pipe end having a second annular slot therein, said second slot containing a second annular concave high-conductivity, low-permeability layer defining a second annular cavity, and a second coil fixedly mounted within said second annular cavity; and screw thread means for forcing said inner shoulder against said inner pipe end such that said first layer and said second layer are forcibly pressed together to form a closed high-conductivity, low-permeability toroidal path enclosing both coils.

20. An inductive coupler according to claim 19, wherein each coil has an axially elongated cross section.

21. An inductive coupler according to claim 19, wherein each layer includes a material selected from a group of materials, the group consisting of copper, brass, bronze, beryllium copper, silver, aluminum, gold, tungsten, and zinc.

22. An inductive coupler according to claim 19, wherein each layer is a coating of a material including a material selected from a group of materials, the group consisting of copper, brass, bronze, beryllium copper, silver, aluminum, gold, tungsten, and zinc.

23. An inductive coupler according to claim 19, wherein said first layer is an insert of a material including a material selected from a group of materials, the group consisting of copper, brass, bronze, beryllium copper, silver, aluminum, gold, tungsten, and zinc.

24. An inductive coupler according to claim 19, wherein each coil is encapsulated in potting material.

25. An inductive coupler according to claim 19, wherein said first and second layers define a toroidal path, and wherein said toroidal path includes at least one portion of pipe end.

26. A wired pipe joint having an axial bore, comprising:
an elongate tubular shank;
a box-end, at a first end of said shank, said box-end defining an annular outer pipe end, a first annular innermost inner shoulder, a first annular middle inner shoulder, a first annular outermost inner shoulder, and a first internal thread between said outer pipe end and said outermost annular inner shoulder;
a first coil at said first middle shoulder;
a first annular electrically-insulating spacer;
a first annular high-conductivity, low-permeability annular enclosure having a first annular body portion and a first annular rim portion, said first rim portion having a larger diameter than said first body portion, said first body portion attached to said box-end at said first innermost shoulder, said first rim portion locking said first coil and said first spacer to said box-end;
a pin-end, at a second end of said shank, said pin-end defining an annular outer shoulder, a second annular innermost inner shoulder, a second annular middle inner shoulder, a second inner pipe-end, and a second internal thread between said outer pipe end and said second inner pipe-end;

a second coil at said second middle shoulder;

a second annular electrically-insulating spacer;

a second annular high-conductivity, low-permeability annular enclosure having a second cylindrical body portion and a second cylindrical rim portion, said second rim portion having a larger diameter than said second body portion, said second body portion attached to said box end at said second innermost shoulder, said second rim portion locking said second coil and said second spacer to said pin-end; and means for electrically coupling coil windings of said first and second coils.

27. A wired pipe joint according to claim 26, wherein said first innermost annular inner shoulder defines a third internal thread, and said first body portion is threaded and is attached to said box-end by said third internal thread.

28. A wired pipe joint according to claim 26, wherein said box-end defines a first annular inner wall between first internal threads and outermost inner shoulder, and further comprises a first annular high-conductivity, low-permeability layer on said first annular inner wall.

29. A wired pipe joint according to claim 26, wherein said box-end comprises an annular high-conductivity, low-permeability layer at said first middle shoulder.

30. A wired pipe joint according to claim 26, wherein said pin-end comprises an annular high-conductivity, low-permeability layer at said second middle shoulder.

31. A wired pipe joint according to claim 26, wherein said second innermost annular inner shoulder defines a fourth internal thread, and said second threaded body portion is attached to said pin-end by said fourth internal thread.

32. A wired pipe joint having an axial bore, comprising:

an elongate tubular shank;

a box-end, at a first end of said shank, said box-end defining an annular outer pipe end, an annular contacting inner shoulder having a first annular slot therein, and a first internal thread between said outer pipe end and said inner shoulder;

a first coil fixedly mounted within said first annular slot;

a pin-end, at a second end of said shank, said pin-end defining an annular inner contacting shoulder, an annular pipe end, and a second external thread extending from said pipe end to said outer shoulder;

an annular, high-conductivity, low-permeability enclosure having a second annular slot therein, said enclosure attached to said annular pipe end;

a second coil in said second annular slot; and means for electrically coupling coil windings of said first and second coils.

33. A wired pipe joint according to claim 32, wherein said enclosure is attached to said pipe-end by screw threads.

34. A wired pipe joint according to claim 32, further comprising a first annular high-conductivity, low-permeability layer within said first slot.

35. A wired pipe joint according to claim 32, said box-end further comprising an inner annular cylindrical face between said first slot and said first threads having a high-conductivity, low-permeability layer thereon.

36. A wired pipe joint having an axial bore, comprising:

an elongate tubular shank;

a box-end defining a first shaped surface encircling the axial bore, said box-end including a first layer of high-conductivity, low-permeability material on said first shaped surface defining a first shaped belt;

a first tubular support member attached to said box-end within the axial bore;

a first coil co-axial with, encircled by, and supported by, said first tubular support member, said coil encircling but separated from said first shaped belt;

a pin-end defining a second shaped surface encircling the axial bore, said pin-end including a second layer of high-conductivity, low-permeability material on said second shaped surface defining a second shaped belt;

a second tubular support member attached to said pin-end within the axial bore;

a second coil co-axial with, encircled by, and supported by, said second tubular support member, said coil encircling but separated from said second shaped belt; and means for electrically coupling coil windings of said first and second coils.

37. A wired pipe joint having an axial bore, comprising:

an elongate tubular shank;

a box-end, at a first end of said shank, said box-end defining a contacting annular outer pipe end, an internal thread proximate to said outer pipe end, and a first annular slot between said internal thread and said outer pipe end, said first slot containing a first annular concave high-conductivity, low-permeability layer defining a first annular cavity, and a first coil fixedly mounted within said first annular cavity;

a pin-end, at a second end of said shank, said box-end defining a contacting annular outer shoulder, an external thread proximate to said outer shoulder, and a second annular slot between said external thread and said outer shoulder, said second slot containing a second annular concave high-conductivity, low-permeability layer defining a second annular cavity, and a second coil fixedly mounted within said second annular cavity; and means for electrically coupling coil windings of said first and second coils.

38. A wired pipe joint having an axial bore, comprising:

an elongate tubular shank;

a box-end, at a first end of said shank, said box-end defining a sealing pipe end and an internal thread, said sealing pipe end having a first annular slot therein, said first slot containing a first annular concave high-conductivity, low-permeability layer defining a first annular cavity, and a first coil fixedly mounted within said first annular cavity;

a pin-end, at a second end of said shank, said pin-end defining a sealing shoulder and an external thread, said sealing shoulder having a second annular slot therein, said second slot containing a second annular concave high-conductivity, low-permeability layer defining a second annular cavity, and a second coil fixedly mounted within said second annular cavity; and means for electrically coupling coil windings of said first and second coils.

39. An inductive coupler according to claim 38, wherein said sealing outer pipe end includes inner and outer annular portions separated by said first slot, and said sealing shoulder includes inner and outer annular portions separated by said second slot.

40. An inductive coupler according to claim 38, further comprising a third high-conductivity, low-permeability layer over an internal annular face proximate to said internal thread.

41. An inductive coupler according to claim 38, further comprising a fourth high-conductivity, low-permeability layer over an external annular face proximate to said external thread.

42. A wired pipe joint with an elongate tubular shank having an axial bore, a threaded box-end, and a threaded pin end, comprising:

a first annular coil fixedly mounted to said box-end;

a first high-conductivity, low-permeability layer partially surrounding said first annular coil;

a second annular coil fixedly mounted to said pin-end;

a second high-conductivity, low-permeability layer partially surrounding said second annular coil; and means for electrically coupling coil windings of said first and second coils;

such that when the box-end of a first wired pipe joint is coupled for operation with the pin-end of a second wired pipe joint, said first and second high-conductivity, low-permeability layers form at least a portion of a toroidal path enclosing said first annular coil of said first wired pipe joint and said second annular coil of said second wired pipe joint.

43. An inductive coupler, comprising:

a threaded box-end including a first annular coil fixedly mounted thereto, and further including a first high-conductivity, low-permeability layer partially surrounding said first annular coil;

a first electrical terminal coupled to a first coil winding of said first annular coil;

a threaded pin-end including a second annular coil fixedly mounted thereto, and further including a second high-conductivity, low-permeability layer partially surrounding said second annular coil; and a second electrical terminal coupled to a second coil winding of said second annular coil;

such that when said threaded box-end is coupled for operation with the threaded pin-end, said first and second high-conductivity, low-permeability layers form at least a portion of a toroidal path enclosing said first annular coil and said second annular coil.

* * * * *